(12) United States Patent
Maeda et al.

(10) Patent No.: US 7,787,747 B2
(45) Date of Patent: Aug. 31, 2010

(54) PLAYBACK APPARATUS, PLAYBACK METHOD, RECORDING MEDIUM, AND PROGRAM

(75) Inventors: Tetsuhiro Maeda, Tokyo (JP);
Kenichiro Nagao, Chiba (JP); Atsushi Mae, Tokyo (JP); Hiroki Shiina, Kanagawa (JP)

(73) Assignee: Sony Corporation, Tokyo (JP)

( * ) Notice: Subject to any disclaimer, the term of this patent is extended or adjusted under 35 U.S.C. 154(b) by 1281 days.

(21) Appl. No.: 11/316,960

(22) Filed: Dec. 27, 2005

(65) Prior Publication Data
US 2006/0147121 A1    Jul. 6, 2006

(30) Foreign Application Priority Data
Jan. 5, 2005    (JP)    ............... 2005-000316

(51) Int. Cl.
H04N 5/91    (2006.01)
(52) U.S. Cl. .................. 386/68; 386/5; 386/6; 382/233
(58) Field of Classification Search .................. 386/68, 386/5, 6; 382/233
See application file for complete search history.

(56) References Cited
U.S. PATENT DOCUMENTS
6,480,664 B1    11/2002    Ting et al.

| | | | |
|---|---|---|---|
| 2003/0081939 A1* | 5/2003 | Kim et al. | 386/67 |
| 2003/0194224 A1 | 10/2003 | Nagasawa | |
| 2004/0126097 A1 | 7/2004 | Aridome | |
| 2004/0131332 A1 | 7/2004 | Wilson et al. | |
| 2005/0047760 A1* | 3/2005 | Nakatani et al. | 386/125 |
| 2006/0098953 A1* | 5/2006 | Nagasawa | 386/111 |

FOREIGN PATENT DOCUMENTS
EP    1 309 195 A2    5/2003

\* cited by examiner

Primary Examiner—Thai Tran
Assistant Examiner—Girumsew Wendmagegn
(74) Attorney, Agent, or Firm—Oblon, Spivak, McClelland, Maier & Neustadt, L.L.P.

(57) ABSTRACT

A playback apparatus for playing back a moving image at a speed higher than a normal speed of the moving image on the basis of moving image data for displaying the moving image, the moving image data being coded by setting a predetermined number of images as a unit, is provided. The playback apparatus includes a storage section temporarily storing the obtained moving image data; a decoding section decoding the moving image data read from the storage section; a detection section detecting transfer rates; a storage control section controlling the storage of a number of the units; a selection section selecting one of the combinations from among the combinations indicated by the stored combination information in a predetermined procedure; an obtainment control section controlling the obtainment of the image data.

16 Claims, 19 Drawing Sheets

FIG. 7

| SKIP INTERVAL Ns | 1 | 2 | 3 | 4 | ... | Nsi |
|---|---|---|---|---|---|---|
| NUMBER OF CONSECUTIVE FRAMES Nh | 3 | 6 | 9 | 12 | ... | Nsi × 3 |

FIG. 17

| COMBINATION NUMBER I | ... | i−3 | i−2 | i−1 | i | i+1 | i+2 | i+3 | ... |
|---|---|---|---|---|---|---|---|---|---|
| SKIP INTERVAL Ns | ... | Ns_bi−3 | Ns_bi−2 | Ns_bi−1 | Ns_bi | Ns_bi+1 | Ns_bi+2 | Ns_bi+3 | ... |
| NUMBER OF CONSECUTIVE FRAMES Nh | ... | Nh_bi−3 | Nh_bi−2 | Nh_bi−1 | Nh_bi | Nh_bi+1 | Nh_bi+2 | Nh_bi+3 | ... |
| PRIORITY | | | | 2 | 1 | 3 | 4 | 5 | |
| AVERAGE READ TRANSFER RATE R1ave(i) | | | | R1ave(i−1) | R1ave(i) | R1ave(i+1) | R1ave(i+2) | R1ave(i+3) | |

PLAYBACK APPARATUS, PLAYBACK METHOD, RECORDING MEDIUM, AND PROGRAM

CROSS REFERENCES TO RELATED APPLICATIONS

The present invention contains subject matter related to Japanese Patent Application JP 2005-000316 filed in the Japanese Patent Office on Jan. 5, 2005, the entire contents of which are incorporated herein by reference.

BACKGROUND OF THE INVENTION

1. Field of the Invention

The present invention relates to a playback apparatus, a playback method, a recording medium, and a program. More particularly, the present invention relates to a playback apparatus for playing back a moving image, a playback method therefor, a recording medium therefor, and a program therefor.

2. Description of the Related Art

As a system for recording image data as a digital image signal on a DVD (Digital Versatile Disc) and a CD (Compact Disc), an MPEG (Moving Pictures Experts Group) system is widely used. In the MPEG system, an I (Intra coded) picture, a B (Bidirectionally predictive-coded) picture, and a P (Predictive coded) picture, which are generated by using a compression technology called an "inter-frame prediction", are defined. Data of an I picture, data of a P picture, and data of a B picture are image data that is compressed and coded in such a manner that data of an I picture is generated independently of other frames, data of a P picture is generated from past data of an I picture or a P picture, and data of a B picture is generated from past and/or future data of an I picture or a P picture.

In the image data of the MPEG system, which is recorded on a DVD or a CD, as shown in FIG. 1, an I picture, a B picture, and a P picture are arranged in such a manner that a fixed arrangement order is repeated. A GOP (Group of Pictures) described in the MPEG is a fixed arrangement order of an I picture, a B picture, and a P picture that is repeated, and is the unit of coding. One GOP contains at least one I picture. That is, data of an I picture, which is a coding image plane by closed information within the image plane, is periodically inserted into image data. The term "GOP" refers to an image plane group structure in which at least one I picture is contained.

The I picture, the B picture, and the P picture will be hereinafter referred to simply as a "picture" when these do not have to be distinguished individually from one another.

FIG. 2 shows the configuration of a playback apparatus of the related art, for playing back recorded image data. A DVD 1 has recorded thereon image data of the MPEG system. A drive 2 reads data of a picture among the recorded image data of the MPEG system. A storage control section 3 controls the storage of a buffer 4 for temporarily storing read data of a picture forming the image data.

A decoder 5 sequentially reads the stored data of a picture from the buffer 4, decodes the read data of a picture, and supplies so-called baseband image data, which is obtained by decoding and which is not compression-coded, to a display control section 6 at an interval in accordance with the frame rate (video frame rate).

The display control section 6 causes a display device 7 to display a moving image on the basis of the image data supplied from the decoder 5 at a predetermined frame rate.

In this manner, a moving image is displayed at a normal speed of the moving image using the image data recorded on the DVD 1.

In the playback of a moving image at a normal speed of the moving image, the storage control section 3 controls the storage of data of a picture into the buffer 4 so that the moving image displayed on the display device 7 is not interrupted and an overflow or an underflow does not occur in the data of a picture, which is recorded in the buffer 4. As shown in FIG. 3, when the amount of the data of a picture stored in the buffer 4 exceeds a threshold value for detecting an overflow, the storage control section 3 controls the storage so as the drive 2 to stop the reading of the data of a picture from the DVD 1, so that an overflow does not occur in the buffer 4.

When the decoder 5 is made to continue the decoding while the drive 2 keeps stopping the reading of data of a picture from the DVD 1, the amount of the data of a picture stored in the buffer 4 decreases. When the amount of the data of a picture stored in the buffer 4 falls below (becomes less than) the threshold value for detecting an underflow, the storage control section 3 controls the storage so that the storage control section 3 causes the drive 2 to restart the reading of the data of a picture from the DVD 1 so that an underflow does not occur in the buffer 4.

When attempts are made to perform a so-called high-speed playback for playing back a moving image at a speed n times as fast as the normal speed of the moving image by the same method as the method of playing back a moving image at the normal speed of the moving image, there are cases in which it is difficult for the decoder 5 to decode the data of a picture within the requested time, and it is difficult to play back the moving image at a target speed.

For this reason, as shown in FIG. 4, there is a known method of continuing a high-speed playback by decoding only the data of a picture at the beginning among the I picture, the P picture, and the B picture contained in one GOP. That is, the drive 2 reads, from the DVD 1, only the data of an I picture at the beginning among the I picture, the P picture, and the B picture contained in one GOP, and stores the read data of an I picture in the buffer 4. Next, the data of an I picture stored in the buffer 4 is sequentially transferred to the decoder 5, and the decoder 5 decodes the data of an I picture. The decoder 5 supplies the baseband image data obtained as a result of the decoding to the display control section 6. The display control section 6 displays the image on a display device on the basis of the baseband image data.

As described above, it is possible to play back a moving image at a speed n times as fast as the normal speed of the moving image. The reason why only the data of an I picture is used in the high-speed playback is that the data of an I picture can be decoded singly because the data of an I picture, unlike the P picture or the B picture, has no correlation with the other pictures.

Here, if the number of pictures contained in one GOP is denoted as Np, the speed at which a playback can be performed in the high-speed playback method of playing back only the I picture at the beginning contained in one GOP is Np times as fast. That is, when the number of pictures Np contained in one GOP is 6, while 6 pictures contained in one GOP are played back in the playback at a normal speed, the I pictures of 6 GOPs are played back in the high-speed playback, and the playback speed in the high-speed playback becomes 6 times as fast.

In the above-described high-speed playback method for playing back only the I picture at the beginning contained in one GOP, the playback speed is determined by the number of pictures Np, which is the number of pictures contained in one GOP, and it is difficult to change the playback speed.

Therefore, in order to increase the degree of freedom of the speed in the high-speed playback, a high-speed playback method may be used in which, rather than playing back the I pictures at the beginning of all the GOPs, the GOPs are skipped so that only the one I picture is played back from one GOP for each skip interval Ns, which is a fixed interval, and the same I picture is continued to be displayed repeatedly by the number of consecutive frames Nh, which is a fixed number of frames.

In this high-speed playback method, the playback speed is determined by the skip interval Ns, the number of consecutive frames Nh, and the number of pictures Np. That is, the moving image is played back at a speed determined by Ns×Np/Nh. Therefore, as a result of adjusting the skip interval Ns and the number of consecutive frames Nh, the moving image can be displayed at a desired playback speed without being limited to the number of pictures Np.

In the high-speed playback method in which the GOPs are skipped so that only the one I picture is played back from one GOP for each skip interval Ns, which is a fixed interval, and the same I picture is continued to be displayed repeatedly by the number of consecutive frames Nh, which is a fixed number of frames, a plurality of combinations of the skip interval Ns and the number of consecutive frames Nh for performing a high-speed playback at a desired speed exist.

FIG. 5 shows the relationship between GOPs and the skip interval Ns and between frames and the number of consecutive frames Nh. In the case shown in FIG. 5, since a high-speed playback is performed on the basis of the skip interval Ns of 3 and the number of consecutive frames Nh of 2, one I picture is extracted from 3 GOPs, and the I picture is displayed as a frame for two times. In the case shown in FIG. 5, since one GOP is composed of 6 pictures, the playback speed becomes Ns×Np/Nh, that is, 3×6/2=9 times as fast.

However, it is difficult to determine the combination of the skip interval Ns and the number of consecutive frames Nh in the high-speed playback at a desired speed as desired without considering constraint conditions at all.

For example, there are two constraint conditions described below. A first constraint condition is concerned with influences upon a user. That is, it may be said that, when the number of consecutive frames Nh is great, the same image is displayed in a continued manner, and the greater the number of consecutive frames Nh, the more information is lost from the moving image displayed on the display device 7. That is, it may be said that the greater the number of consecutive frames Nh, the more information to be provided to the user is lost. For example, when the number of consecutive frames Nh is too great, when the user wants to find a target scene, the image of that scene is not displayed on the display device 7 and the user is unable to find the scene. Furthermore, when the number of consecutive frames Nh is too great, the user is forced to view the same image for a long period of time. That is, the user feels in such a manner that a still image is switched for each that period and it is difficult for the user to obtain a sense of reality of performing a high-speed playback.

A second constraint condition is concerned with the performance of the playback system, which is related to the reading and decoding of data.

More specifically, the data of an I picture has a larger amount of data in comparison with the data of a P picture or the data of a B picture. Therefore, if the skip interval Ns is too small, the amount of data that is requested in the high-speed playback per unit time, becomes sharply increased in comparison with the amount of data that is requested in the normal playback per unit time.

Furthermore, when the skip interval Ns is small, the positions (intervals) on the DVD 1 on which the data of an I picture to be read from the DVD 1 is recorded become small. When the next data of an I picture is to be read after one piece of the data of an I picture, the position of the next data of an I picture is gone too far, the drive 2 needs to seek or needs a rotational delay, and thus, there may need to take a longer time to read the data of an I picture. In such a case, when compared to the amount of the requested data of an I picture per unit time, the amount of the data of an I picture transferred actually to the buffer 4 per unit time becomes smaller.

Since the reading from the buffer 4 can be performed at a high speed, if the skip interval Ns is too small, the transfer rate at which the data of an I picture is read from the DVD 1 and is transferred to the buffer 4 falls below the rate at which data is transferred from the buffer 4 to the decoder 5. The term "transfer rate" as used herein refers to the amount of data transferred per unit time.

Then, a state is reached in which the amount of the data stored in the buffer 4 typically falls below the threshold value for detecting an underflow, and it is difficult to perform a playback.

Therefore, it is necessary that the transfer rate at which the data of an I picture is read from the DVD 1 and is transferred to the buffer 4 does not fall below the rate at which data is transferred from the buffer 4 to the decoder 5.

Hitherto, there is a known method in which, when a 3× speed playback is performed, a repeated playback of an I picture that is extracted from within information in VOBU (Video Object Unit) units and that is decoded by 15/3=5 times (5 frames) is repeated in VOBU units, and when a 5× speed playback is performed, a repeated playback of an I picture that is extracted from within information in VOBU units and is decoded by 15/5=3 times (3 frames) is repeated in VOBU units (refer to, for example, Japanese Unexamined Patent Application Publication No. 2004-312663).

SUMMARY OF THE INVENTION

The transfer rate at which data of an I picture is read from the DVD 1 and is transferred to the buffer 4 and the transfer rate at which data is transferred from the buffer 4 to the decoder 5 vary depending on the state of the DVD 1 and the amount of data of an I picture. For example, when the DVD 1 is damaged (the surface of the DVD 1 is damaged), an error may occur in the reading of data from the DVD 1, and the value of the transfer rate at which data of an I picture is read from the DVD 1 and is transferred to the buffer 4 may decrease. Furthermore, for example, when the amount of data of an I picture is large, the time taken to transfer from the buffer 4 to the decoder 5 becomes longer, and the value of the rate at which data transferred from the buffer 4 to the decoder 5 is maintained at a large value for that period of time.

Such a state of the DVD 1 or such an amount of data of an I picture exert an influence on the generation of an underflow in the buffer 4.

In a playback system of the related art employing a high-speed playback method in which GOPs are skipped so that only the one I picture is played back from one GOP for each skip interval Ns, which is a fixed interval, and the same I picture is continued to be displayed repeatedly by the number of consecutive frames Nh, which is a fixed number of frames, the skip interval Ns and the number of consecutive frames Nh are determined by considering the quality of the moving image displayed by a high-speed playback and the performance of the system, which is related to the reading and decoding of data, and the skip interval Ns and the number of consecutive frames Nh are made to be fixed values.

When the surface of the DVD 1 is damaged or a warp to such a degree that does not meet a standard occurs in the DVD 1, it is difficult to read data from the DVD 1 at an expected speed. As a result, when a high-speed playback is to be continued at the skip interval Ns and the number of consecutive frames Nh that are determined in advance, an underflow occurs in the buffer 4, and it is difficult to continue the high-speed playback.

Furthermore, by considering such an occurrence of an exceptional phenomenon, when the skip interval Ns and the number of consecutive frames Nh are determined by making the transfer rate at which data of an I picture is read from the DVD 1 and is transferred to the buffer 4 to be values sufficiently smaller than the values in the normal case, the skip interval Ns and the number of consecutive frames Nh become larger values. As a result, there arise problems in that the quality of the image displayed in a high-speed playback is decreased, and it becomes difficult to satisfy the quality of the image that should originally be satisfied in the high-speed playback.

As described above, hitherto, a stable continuation of a high-speed playback and an increase (improvement) in the quality of an image displayed in a high-speed playback are contrary requests, and it is difficult to satisfy both requests.

The present invention has been made in view of such circumstances. It is desirable to be capable of displaying a higher quality image while a high-speed playback is continued stably.

According to an embodiment of the present invention, there is provided a playback apparatus for playing back a moving image at a speed higher than a normal speed of the moving image on the basis of moving image data for displaying the moving image, the moving image data being coded by setting a predetermined number of images as a unit, the playback apparatus including: storage means for temporarily storing the obtained moving image data; decoding means for decoding the moving image data read from the storage means; detection means for detecting a first transfer rate that indicates the amount of the moving image data written into the storage means per unit time and a second transfer rate that indicates the amount of the moving image data read from the storage means per unit time;

storage control means for controlling the storage of combination information that indicates a combination of a number of units such that a number, which is one of the units from which one piece of image data for displaying one image contained in the units is obtained, the image data forming the moving image data, and the number of consecutive units, which are subsequent to the above one unit, from which the image data is not obtained, are added together; and the number of times of repeatedly outputting the result in which the one piece of the obtained image data is decoded, the combination information corresponding to the playback speed of the moving image; selection means for selecting one of the combinations from among the combinations indicated by the stored combination information in a predetermined procedure when the relationship between the first transfer rate and the second transfer rate reaches a predetermined relationship; obtainment control means for controlling the obtainment of the image data so that one piece of the image data is obtained for each number of the units in the selected combination; and output control means for controlling output so that the result of the decoding of one piece of the obtained image data is repeatedly output for the number of times in the selected combination.

The obtainment control means can control the obtainment of the image data by controlling the reading of the image data from a data recording medium on which the moving image data is recorded.

The obtainment control means can control the obtainment of the image data by controlling the reception of the image data transmitted from an information providing apparatus via a network.

The selection means can select the combination of a larger number of the units from among the combinations indicated by the stored combination information when the first transfer rate is lower than the second transfer rate.

The selection means can select the combination of a smaller number of the units from among the combinations indicated by the stored information when the first transfer rate is higher than the second transfer rate.

The selection means can select the combination in the order of a priority that is attached in advance to each of the combinations.

The selection means can select one of the combinations on the basis of a reference value of a transfer rate that indicates the amount of the moving image data that is written into the storage means or that is read from the storage means per unit time, the reference value being attached in advance to each of the combinations, and on the basis of the combination in which the relationship between the first transfer rate and the second transfer satisfies a predetermined relationship.

According to another embodiment of the present invention, there is provided a playback method including the steps of: detecting a first transfer rate that indicates the amount of the moving image data written into the storage means per unit time and a second transfer rate that indicates the amount of the moving image data read from the storage means per unit time; controlling the storage of combination information that indicates a combination of a number of units such that a number, which is one of the units from which one piece of image data for displaying one image contained in the units is obtained, the image data forming the moving image data, and the number of consecutive units, which are subsequent to the above one unit, from which the image data is not obtained, are added together; and the number of times of repeatedly outputting the result in which the one piece of the obtained image data is decoded, the combination information corresponding to the playback speed of the moving image; selecting one of the combinations from among the combinations indicated by the stored combination information in a predetermined procedure when the relationship between the first transfer rate and the second transfer rate reaches a predetermined relationship; controlling the obtainment of the image data so that one piece of the image data is obtained for each number of the units in the selected combination; and controlling output so that the result of the decoding of one piece of the obtained image data is repeatedly output for the number of times in the selected combination.

According to another embodiment of the present invention, there is provided a recording medium having recorded thereon a program, the program including the steps of: detecting a first transfer rate that indicates the amount of the moving image data written into the storage means per unit time and a second transfer rate that indicates the amount of the moving image data read from the storage means per unit time; controlling the storage of combination information that indicates a combination of a number of units such that a number, which is one of the units from which one piece of image data for displaying one image contained in the units is obtained, the image data forming the moving image data, and the number of consecutive units, which are subsequent to the above one unit, from which the image data is not obtained, are added together; and the number of times of repeatedly outputting the result in which the one piece of the obtained image data is decoded, the combination information corresponding to the playback speed of the moving image; selecting one of the combinations from among the combinations indicated by the stored combination information in a predetermined procedure when the relationship between the first transfer rate and the second transfer rate reaches a predetermined relationship; controlling the obtainment of the image data so that one piece of the image data is obtained for each number of the units in the selected combination; and controlling output so that the result of the decoding of one piece of the obtained image data is repeatedly output for the number of times in the selected combination.

According to another embodiment of the present invention, there is provided a program including the steps of: detecting a first transfer rate that indicates the amount of the moving image data written into the storage means per unit time and a second transfer rate that indicates the amount of the moving image data read from the storage means per unit time; controlling the storage of combination information that indicates a combination of a number of units such that a number, which is one of the units from which one piece of image data for displaying one image contained in the units is obtained, the image data forming the moving image data, and the number of consecutive units, which are subsequent to the above one unit, from which the image data is not obtained, are added together; and the number of times of repeatedly outputting the result in which the one piece of the obtained image data is decoded, the combination information corresponding to the playback speed of the moving image; selecting one of the combinations from among the combinations indicated by the stored combination information in a predetermined procedure when the relationship between the first transfer rate and the second transfer rate reaches a predetermined relationship; controlling the obtainment of the image data so that one piece of the image data is obtained for each number of the units in the selected combination; and controlling output so that the result of the decoding of one piece of the obtained image data is repeatedly output for the number of times in the selected combination.

In the playback apparatus, the playback method, the recording medium, and the program according to the embodiments of the present invention, the obtained moving image data is temporarily stored in the storage means. In the decoding means, the moving image data read from the storage means is decoded. A first transfer rate that indicates the amount of the moving image data written into the storage means per unit time is detected, and a second transfer rate that indicates the amount of the moving image data read from the storage means per unit time is detected. The storage of combination information that indicates a combination of a number of units such that a number, which is one of the units from which one piece of image data for displaying one image contained in the units is obtained, the image data forming the moving image data, and the number of consecutive units, which are subsequent to the above one unit, from which the image data is not obtained, are added together; and the number of times of repeatedly outputting the result in which the one piece of the obtained image data is decoded, the combination information corresponding to the playback speed of the moving image, is controlled. The obtainment of the image data is controlled so that one piece of the image data is obtained for each number of the units in the selected combination. Output is controlled so that the result of the decoding of one piece of the obtained image data is repeatedly output for the number of times in the selected combination.

The playback apparatus may be an independent apparatus or may be a block for performing a playback process of a recording and playback apparatus.

As described above, according to the embodiments of the present invention, it is possible to play back a moving image at a speed higher than a normal speed of the moving image.

Furthermore, according to the embodiments of the present invention, it is possible to display a higher quality image while a high-speed playback is continued more stably.

BRIEF DESCRIPTION OF THE DRAWINGS

FIG. 7 shows a combination between a skip interval Ns and a number of consecutive frames Nh;
FIG. 17 shows an example of combination sets of a skip interval Ns and a number of consecutive frames Nh.

DESCRIPTION OF THE PREFERRED EMBODIMENTS

Figure 1:
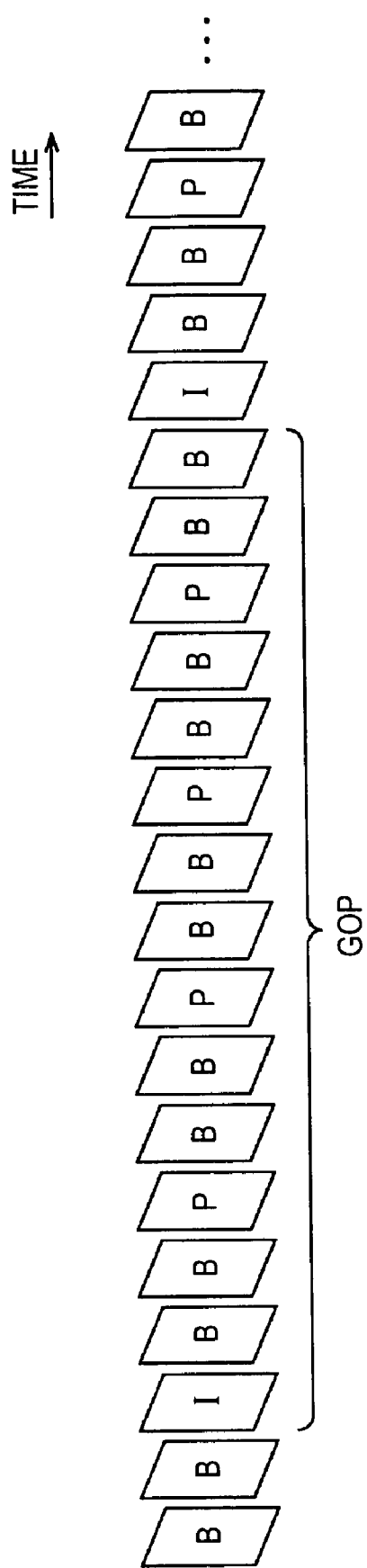
FIG. 1 illustrates a GOP.
Figure 2:
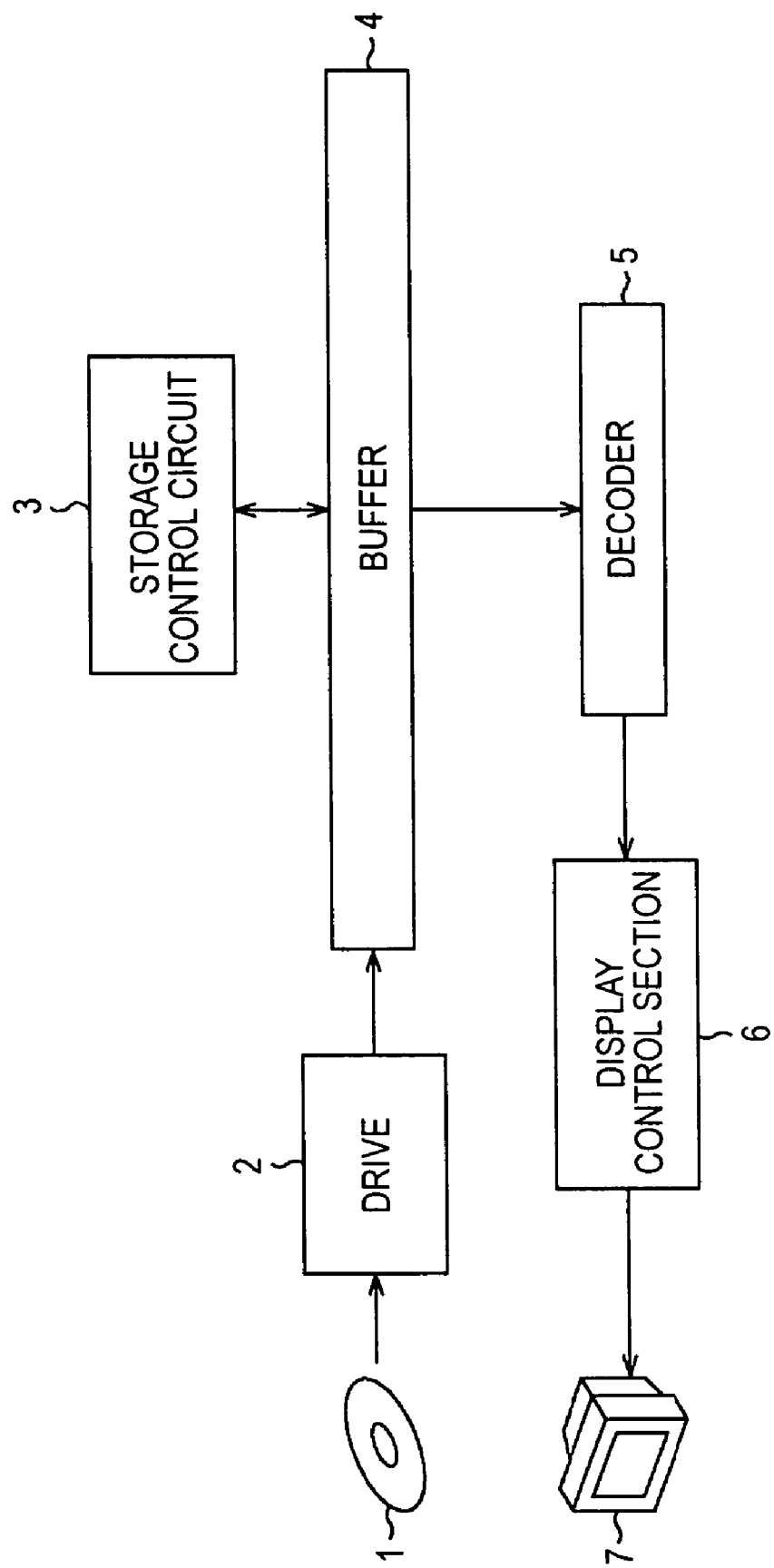
FIG. 2 shows the configuration of a playback apparatus of the related art.
Figure 3:
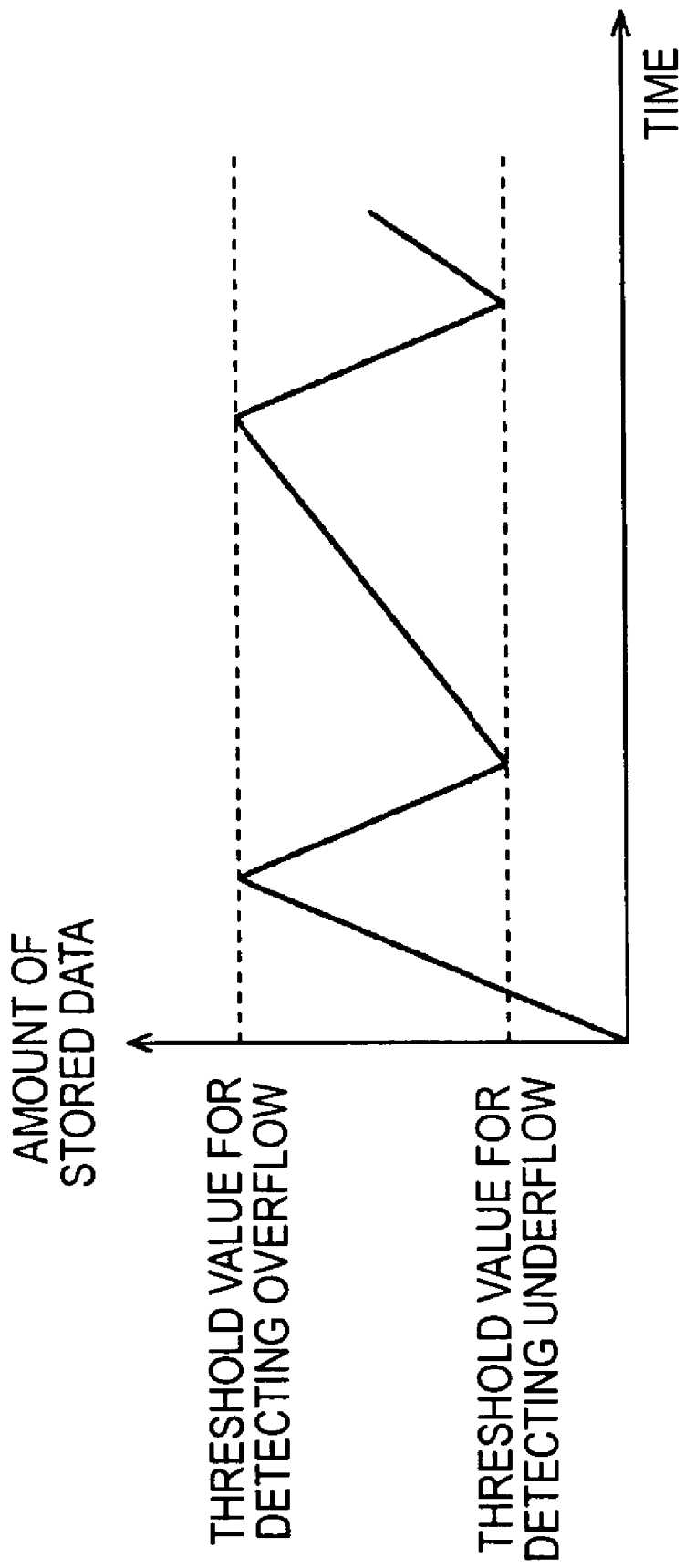
FIG. 3 illustrates the control of storage of data of a picture into a buffer.
Figure 4:
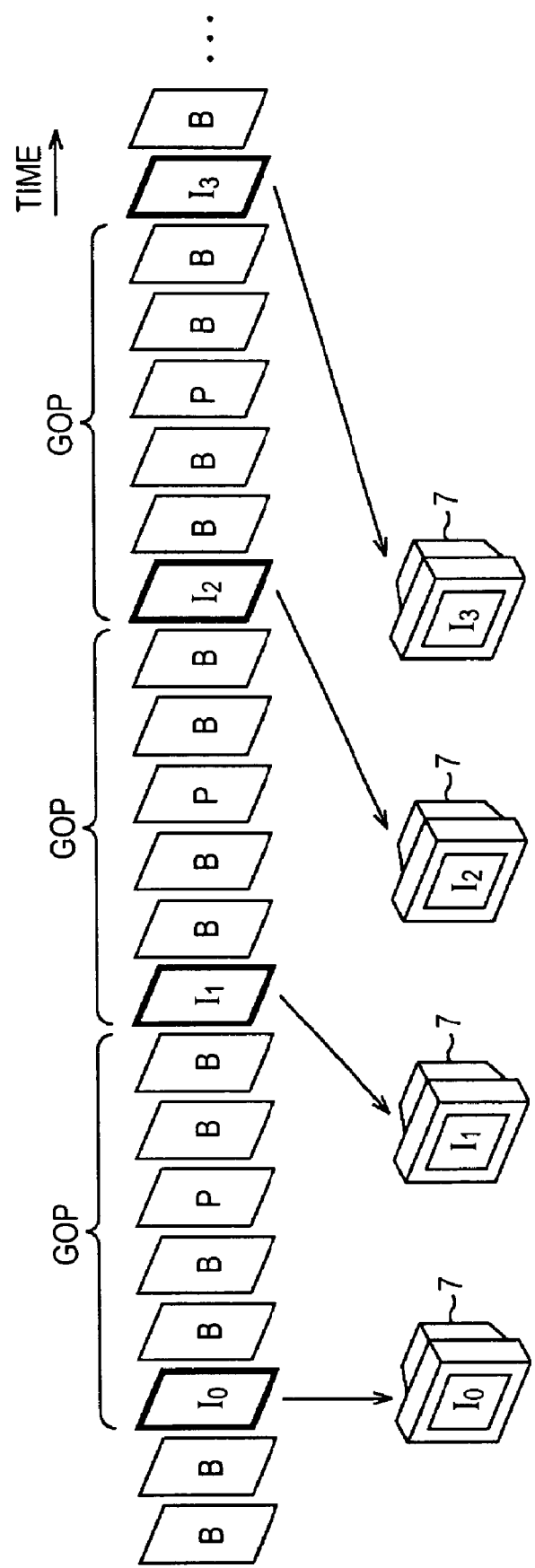
FIG. 4 illustrates a high-speed playback of a moving image.

Before describing an embodiment of the present invention, the correspondence between the features of the claims and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

The playback apparatus according to an embodiment of the present invention is a playback apparatus for playing back a moving image at a speed higher than a normal speed of the moving image on the basis of moving image data for displaying the moving image, the moving image data being coded by setting a predetermined number of images as a unit (for example, a GOP). The playback apparatus includes storage means (for example, a buffer 33 of FIG. 6) for temporarily storing the obtained moving image data; decoding means (for example, a decoder 34 of FIG. 6) for decoding the moving image data read from the storage means; detection means (for example, a transfer rate monitoring section 61 of FIG. 6) for detecting a first transfer rate (for example, a write transfer rate R0) that indicates the amount of the moving image data written into the storage means per unit time and a second transfer rate (for example, a read transfer rate R1) that indicates the amount of the moving image data read from the storage means per unit time; storage control means (for example, a combination set storage section 64 of FIG. 6) for controlling the storage of combination information that indicates a combination of a number of units (for example, a skip interval Ns) such that a number, which is one of the units from which one piece of image data for displaying one image contained in the units is obtained, the image data forming the moving image data, and the number of consecutive units, which are subsequent to the above one unit, from which the image data is not obtained, are added together; and the number of times (for example, a number of consecutive frames Nh) of repeatedly outputting the result in which the one piece of the obtained image data is decoded, the combination information corresponding to the playback speed of the moving image; selection means (for example, a selection section 63 of FIG. 6) for selecting one of the combinations from among the combinations indicated by the stored combination information in a predetermined procedure when the relationship between the first transfer rate and the second transfer rate reaches a predetermined relationship; obtainment control means (for example, a reading control section 71 of FIG. 6, or a communication control section 151 of FIG. 19) for controlling the obtainment of the image data so that one piece of the image data is obtained for each number of the units in the selected combination; and output control means (for example, a decoding control section of FIG. 6) for controlling output so that the result of the decoding of one piece of the obtained image data is repeatedly output for the number of times in the selected combination.

The obtainment control means (for example, a reading control section 71 of FIG. 6) can control the obtainment of the image data by controlling the reading of the image data from a data recording medium (for example, an optical disc of FIG. 6) on which the moving image data is recorded.

Figure 19:
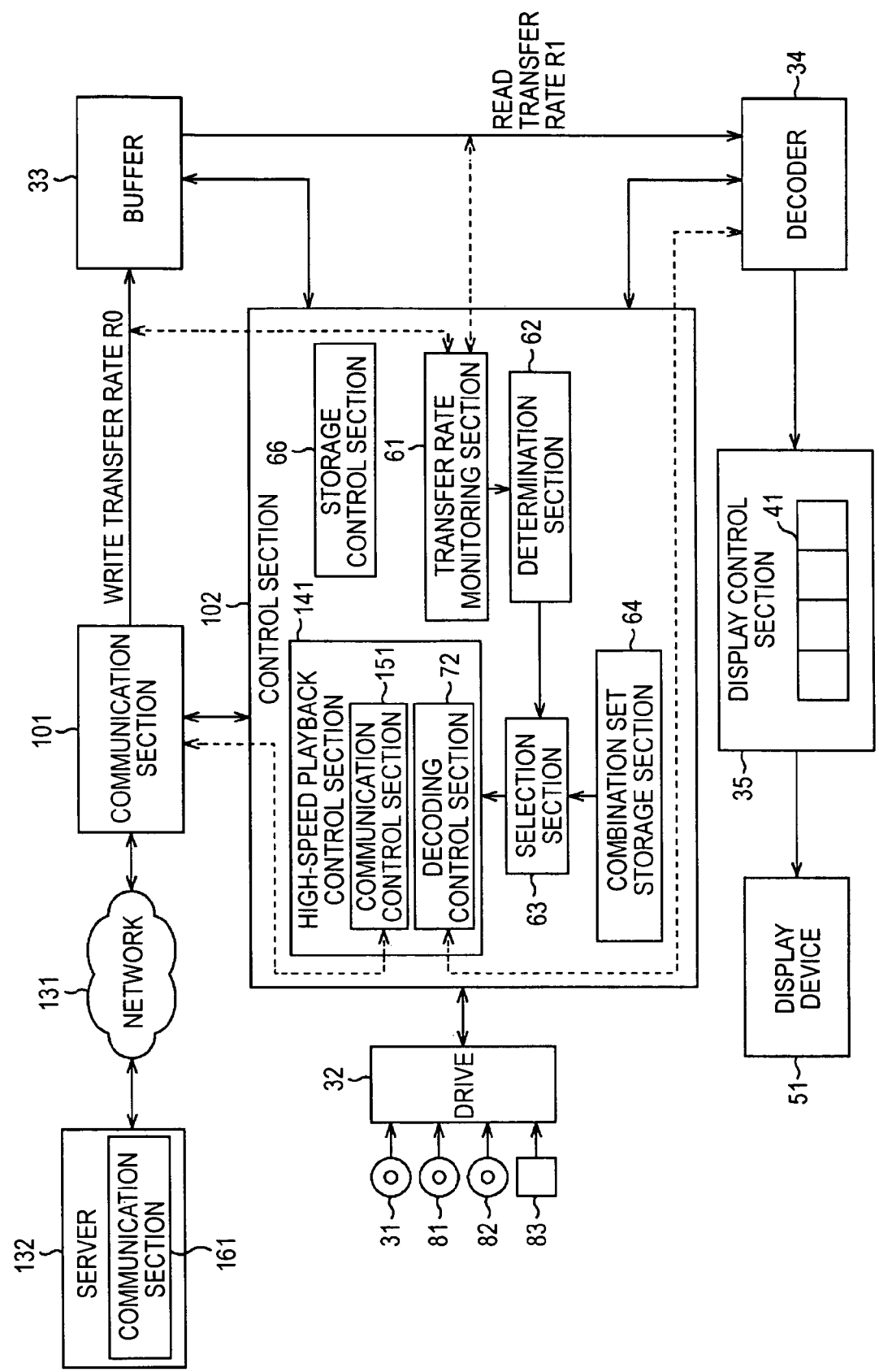
FIG. 19 is a block diagram showing another configuration of an embodiment of a playback apparatus according to the present invention.

The obtainment control means (for example, a communication control section 151 of FIG. 19) can control the obtainment of the image data by controlling the reception of the image data transmitted from an information providing apparatus (for example, a server 132 of FIG. 19) via a network (for example, a network 131 of FIG. 19).

The playback method according to an embodiment of the present invention is a playback method for use with a playback apparatus for playing back a moving image at a speed higher than a normal speed of the moving image on the basis of moving image data for displaying the moving image, the moving image data being coded by setting a predetermined number of images as a unit (for example, a GOP), the playback apparatus including storage means (for example, a buffer 33 of FIG. 6) for temporarily storing the obtained moving image data; and decoding means (for example, a decoder 34 of FIG. 6) for decoding the moving image data read from the storage means. The playback method includes the steps of: detecting (for example, a process of step S15 of FIG. 11) a first transfer rate (for example, a write transfer rate R0) that indicates the amount of the moving image data written into the storage means per unit time and a second transfer rate (for example, a read transfer rate R1) that indicates the amount of the moving image data read from the storage means per unit time; controlling the storage of combination information that indicates a combination of a number of units (for example, a skip interval Ns) such that a number, which is one of the units from which one piece of image data for displaying one image contained in the units is obtained, the image data forming the moving image data, and the number of consecutive units, which are subsequent to the above one unit, from which the image data is not obtained, are added together; and the number of times (for example, a number of consecutive frames Nh) of repeatedly outputting the result in which the one piece of the obtained image data is decoded, the combination information corresponding to the playback speed of the moving image; selecting (for example, a process of step S73 of FIG. 14) one of the combinations from among the combinations indicated by the stored combination information in a predetermined procedure when the relationship between the first transfer rate and the second transfer rate reaches a predetermined relationship; controlling (for example, a process of step S31 or step S32 of FIG. 12) the obtainment of the image data so that one piece of the image data is obtained for each number of the units in the selected combination; and controlling (for example, a process of step S52 or step S53 of FIG. 13) output so that the result of the decoding of one piece of the obtained image data is repeatedly output for the number of times in the selected combination.

The program according to an embodiment of the present invention is a program for enabling a computer of a playback apparatus to perform a playback process, the playback apparatus including storage means (for example, a buffer 33 of FIG. 6) for temporarily storing the obtained moving image data; and decoding means (for example, a decoder 34 of FIG. 6) for decoding the moving image data read from the storage means. The program includes the steps of: detecting (for example, a process of step S15 of FIG. 11) a first transfer rate (for example, a write transfer rate R0) that indicates the amount of the moving image data written into the storage means per unit time and a second transfer rate (for example, a read transfer rate R1) that indicates the amount of the moving image data read from the storage means per unit time; controlling the storage of combination information that indicates a combination of a number of units (for example, a skip interval Ns) such that a number, which is one of the units from which one piece of image data for displaying one image contained in the units is obtained, the image data forming the moving image data, and the number of consecutive units, which are subsequent to the above one unit, from which the image data is not obtained, are added together; and the number of times (for example, a number of consecutive frames Nh) of repeatedly outputting the result in which the one piece of the obtained image data is decoded, the combination information corresponding to the playback speed of the moving image; selecting (for example, a process of step S73 of FIG. 14) one of the combinations from among the combinations indicated by the stored combination information in a predetermined procedure when the relationship between the first transfer rate and the second transfer rate reaches a predetermined relationship; controlling (for example, a process of step S31 or step S32 of FIG. 12) the obtainment of the image data so that one piece of the image data is obtained for each number of the units in the selected combination; and controlling (for example, a process of step S52 or step S53 of FIG. 13) output so that the result of the decoding of one piece of the obtained image data is repeatedly output for the number of times in the selected combination.

Figure 6:
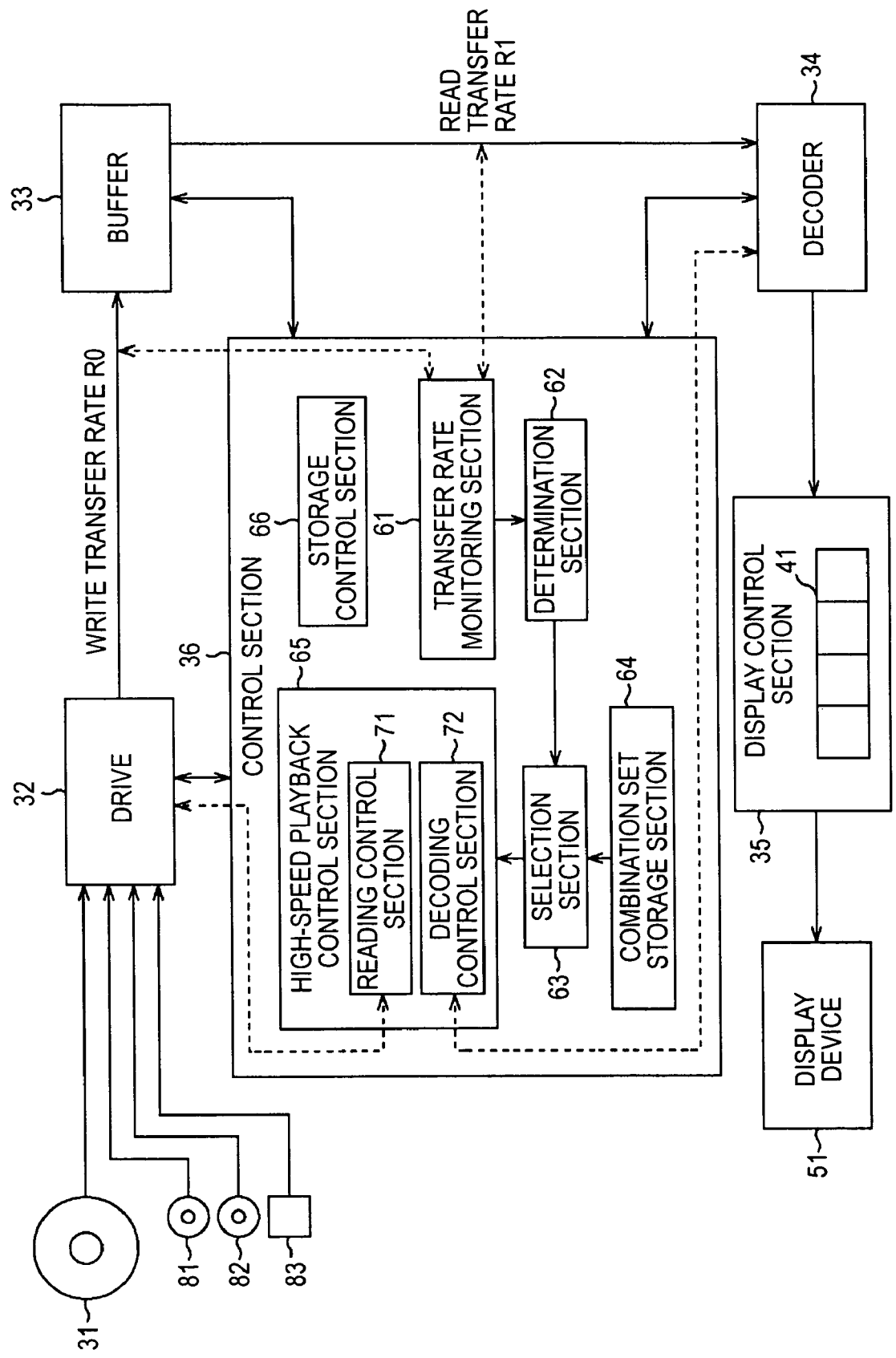
FIG. 6 is a block diagram showing the configuration of an embodiment of a playback apparatus according to the present invention.

The program can be recorded on a recording medium (for example, a magnetic disk 81 of FIG. 6).

FIG. 6 is a block diagram showing the configuration of an embodiment of a playback apparatus according to the present invention. The playback apparatus whose configuration is shown in FIG. 6 plays back a moving image at a speed higher than the normal speed of a moving image on the basis of image data for displaying a moving image, which is recorded on an optical disc 31, such as a DVD or a CD.

The playback apparatus includes a drive 32, a buffer 33, a decoder 34, a display control section 35, and a control section 36. The drive 32 drives the optical disc 31, reads, from the optical disc 31, image data for displaying a moving image recorded on the optical disc 31, and supplies the read image data to the buffer 33. For example, the drive 32 reads image data that is coded in accordance with the MPEG-2 system from the optical disc 31.

The buffer 33 is a so-called FIFO (First-In First-Out) buffer, which is formed of an SRAM (Static Random Access Memory) or a DRAM (Dynamic Random Access Memory), for temporarily storing image data so that first-in first-out is performed. That is, the buffer 33 sequentially stores the image data supplied from the drive 32 and sequentially supplies the stored image data to the decoder 34.

The decoder 34 sequentially reads the stored image data from the buffer 33 and decodes the read image data. The decoder 34 supplies, to the display control section 35, so-called baseband image data that is obtained as a result of the decoding and that is not compression-coded. For example, the decoder 34 reads, from the buffer 33, image data of one picture (hereinafter, also referred to simply as "data of a picture"), which is coded in accordance with the MPEG-2 system. The decoder 34 decodes the read image data of one picture and supplies the obtained baseband image data as image data for displaying frames to the display control section 35.

The display control section 35 causes the display device 51 to display a moving image at a predetermined frame rate on the basis of the image data supplied from the decoder 34. For example, the display control section 35 causes the display device 51 to display a moving image composed of 30 frames per second on the basis of the image data supplied from the decoder 34.

The term "frame rate" used herein refers to the number of frames at which an image is displayed per second.

The display control section 35 includes a frame memory 41. The frame memory 41 stores image data supplied from the decoder 34. The frame memory 41 is structured in such a manner that two or more pieces of image data for displaying one frame can be stored, and stores each of the plurality of the pieces of the image data.

In other words, the decoder 34 writes the baseband image data obtained by decoding into the frame memory 41.

On the basis of the image data stored in the frame memory 41, the display control section 35 generates a signal for displaying an image in accordance with the frame rate and supplies the generated signal to the display device 51, thereby displaying a moving image on the display device 51.

The control section 36, which is formed of a dedicated IC (Integrated Circuit), a general-purpose CPU (Central Processing Unit), or a general-purpose MPU (Micro Processing Unit) to be embedded, controls the overall playback apparatus. More specifically, the control section 36 controls the drive 32, the buffer 33, and the decoder 34. That is, the control section 36 controls the reading of the image data from the optical disc 31 by the drive 32, controls the temporary storage of the image data by the buffer 33, and controls the decoding of the image data by the decoder 34.

The control section 36 includes a transfer rate monitoring section 61, a determination section 62, a selection section 63, a combination set storage section 64, a high-speed playback control section 65, and a storage control section 66. The transfer rate monitoring section 61, the determination section 62, the selection section 63, the combination set storage section 64, the high-speed playback control section 65, or the storage control section 66 may be configured as dedicated hardware or may be realized by a control section 36, which is a computer that executes a program.

The transfer rate monitoring section 61 monitors the amount of the image data supplied from the drive 32 to the buffer 33 per unit time, and also monitors the amount of the image data supplied from the buffer 33 to the decoder 34 per unit time. That is, the transfer rate monitoring section 61 detects a write transfer rate R0, which is the amount of the image data for displaying a moving image per unit time, which is written into the buffer 33, and also detects a read transfer rate R1, which is the amount of data of the image data for displaying a moving image per unit time, which is read from the buffer 33.

For example, the transfer rate monitoring section 61 monitors the amount of the image data supplied from the drive 32 to the buffer 33 per unit time and also monitors the amount of data of the image data supplied from the buffer 33 to the decoder 34 per unit time by monitoring a signal of a bus that connects the drive 32 to the buffer 33 and a signal of a bus that connects the buffer 33 to the decoder 34. The transfer rate monitoring section 61 may be mounted inside the storage control section 66, as will be described later.

The unit time at which the write transfer rate R0 or the read transfer rate R1 is detected can be made to be a time that is computed on the basis of the number of frames that are displayed on the display device 51 by the display control section 35. For example, the unit time at which the write transfer rate R0 or the read transfer rate R1 is detected can be made to be longer than or equal to a time at which two frames are displayed and shorter than or equal to a time at which 10 frames are displayed.

With regard to this, in the drive 32, there are cases in which a seek process or a process for a rotational delay of the optical disc 31 is performed, and for the period of time of this process, it is difficult for the drive 32 to read image data from the optical disc 31. Therefore, if the unit time at which the write transfer rate R0 or the read transfer rate R1 is detected is set to a unit time shorter than the period of time in which the seek process or the process for a rotational delay of the optical disc 31 is performed, the write transfer rate R0 or the read transfer rate R1 that varies extremely is detected. Conversely, in the high-speed playback process, if the unit time is set to a long unit time to such a degree that the amount of the data stored in the buffer 33 greatly changes, it is difficult to stably continue the playback.

Therefore, it is preferable that the unit time be determined by considering the storage capacity of the buffer 33 and the processing in the drive 32.

The write transfer rate R0 and the read transfer rate R1 are detected on the basis of the unit time that is determined by considering the storage capacity of the buffer 33 and the processing in the drive 32.

A description will now be given below of the read transfer rate R1 and the write transfer rate R0. The decoder 34 sequentially reads the stored image data (data of a picture) from the buffer 33, decodes the read image data, and supplies the decoded image data repeatedly for a predetermined number of times to the display control section 35 (the details will be described later). The interval at which the decoder 34 supplies the decoded image data to the display control section 35 is determined by the frame rate. The decoder 34 reads the coded image data from the buffer 33 in such a manner that the supply of the decoded image data to the display control section 35 is in time.

Therefore, the read transfer rate R1 that indicates the amount of data of the image data transferred from the buffer 33 to the decoder 34 per unit time is determined by the amount of data of one piece of data of a picture, the frame rate, and the number of times in which the supply of the decoded image data to the display control section 35 is repeated.

On the other hand, the maximum value of the write transfer rate R0 depends on the performance of the drive 32 and the state of the data recorded on the optical disc 31. Also, the write transfer rate R0 depends on the state of the surface of the optical disc 31.

The transfer rate monitoring section 61 supplies data indicating the detected write transfer rate R0 and the detected read transfer rate R1 to the determination section 62.

On the basis of the data supplied from the transfer rate monitoring section 61, the determination section 62 determines whether or not the relationship between the write transfer rate R0 and the read transfer rate R1 reaches a predetermined relationship. For example, the determination section 62 determines whether or not the write transfer rate R0 is lower than the read transfer rate R1.

The determination section 62 supplies the data indicating the determination result to the selection section 63.

On the basis of the determination result in the determination section 62, the selection section 63 selects one combination from a set composed of a plurality of combinations of the skip interval Ns and the number of consecutive frames Nh, which is stored in the combination set storage section 64 and which correspond to the speed of the high-speed playback of the moving image.

That is, the combination set storage section 64 stores (information indicating) sets of a combination of a skip interval Ns, which is a number of units such that a number, which is one of the GOPs from which one piece of image data for displaying one image contained in the GOPs is obtained, the image data forming the moving image data, and the number of consecutive GOPs, which are subsequent to the above one GOP, from which the image data is not obtained, are added together; and a number of consecutive frames Nh, which is the number of times of repeatedly outputting the result in which the one piece of the obtained image data is decoded, the combination information corresponding to the playback speed of the moving image. The combination set storage section 64 stores (information indicating) combination sets of the skip interval Ns and the number of consecutive frames Nh for each speed of the playback of the moving image.

On the basis of the determination result in the determination section 62, the selection section 63 selects one combination from the combination sets of the skip interval Ns and the number of consecutive frames Nh, which is stored in the combination set storage section 64. For example, when it is determined that the write transfer rate R0 falls below the read transfer rate R1, the selection section 63 selects a combination composed of the skip interval Ns that is larger than the current skip interval Ns from the combination sets of the skip interval Ns and the number of consecutive frames Nh.

The selection section 63 supplies the data indicating the skip interval Ns and the number of consecutive frames Nh of the selected combination to the high-speed playback control section 65.

On the basis of the data supplied from the selection section 63, the high-speed playback control section 65 controls the drive 32 and the decoder 34 so as to perform a high-speed playback. That is, on the basis of the skip interval Ns and the number of consecutive frames Nh indicated by the data supplied from the selection section 63, the high-speed playback control section 65 controls the reading of the image data recorded on the optical disc 31 and the output of the result of decoding the image data.

The high-speed playback control section 65 includes a reading control section 71 and a decoding control section 72. The reading control section 71 controls the drive 32 on the basis of the data supplied from the selection section 63. More specifically, the reading control section 71 controls the obtainment of the image data of the drive 32 so that one piece of data of a picture is obtained for each number of GOPs of the skip interval Ns indicated by the data supplied from the selection section 63. For example, the reading control section 71 controls the obtainment of the image data of the drive 32 so that the first data of an I picture is obtained from the GOP at the beginning among the GOPs of the number of the skip interval Ns for each number of GOPs of the skip interval Ns. Here, the skip interval Ns is an integer greater than 0.

The image data that is, for example, data of a picture, which is read into the drive 32, is sequentially stored in the buffer 33. As will be described later, the storage of the buffer 33 is controlled so that an overflow or an underflow does not occur in the buffer 33.

The decoding control section 72 controls the decoder 34 on the basis of the data supplied from the selection section 63. More specifically, on the basis of the number of consecutive frames Nh indicated by the data supplied from the selection section 63, the decoding control section 72 controls the output of the decoder 34 so that the result of decoding one piece of data of a picture is output to the display control section 35 in a repeated manner for the number of times of the value of the number of consecutive frames Nh.

For example, the decoding control section 72 causes the decoder 34 to read the data of an I picture from the buffer 33 and to decode the read data of an I picture. When the number of consecutive frames Nh is 2, the decoding control section 72 causes the decoder 34 to write the first image data obtained by decoding, into the frame memory 41 of the display control section 35 at a timing corresponding to the time at which the first frame is displayed, and to write the first image data into the frame memory 41 of the display control section 35 at a timing corresponding to the time at which the second frame is displayed. When the number of consecutive frames Nh is 2, the decoding control section 72 causes the decoder 34 to write the second image data obtained by decoding, into the frame memory 41 of the display control section 35 at a timing corresponding to the time at which the third frame is displayed, and to write the second image data into the frame memory 41 of the display control section 35 at a timing corresponding to the time at which the fourth frame is displayed.

That is, when the number of consecutive frames Nh is m, the decoding control section 72 causes the decoder 34 to write one piece of image data obtained by decoding, into the frame memory 41 of the display control section 35 in a repeated manner for m times at a timing corresponding to the time at which each of the m frames is displayed. Here, the number of consecutive frames Nh is an integer greater than 0.

In the high-speed playback, the speed of a playback is determined by the skip interval Ns, the number of consecutive frames Nh, and the number of pictures Np. That is, the moving image is played back at a speed determined by Ns×Np/Nh. The skip interval Ns and the number of consecutive frames Nh are adjusted, and the moving image is displayed at a desired playback speed.

The decoder 34 writes one piece of image data obtained by decoding, into the frame memory 41 of the display control section 35 in a repeated manner for the number of times indicated by the number of consecutive frames Nh at an interval in accordance with the frame rate. Therefore, if the number of consecutive frames Nh becomes greater, the number of pieces of the data of an I picture, which is read from the buffer 33 per unit time, is decreased. That is, it may be said that, if the number of consecutive frames Nh becomes greater, the read transfer rate R1 that indicates the amount of the image data per unit time for displaying the moving image, which is read from the buffer 33, becomes smaller.

The storage control section 66 controls the temporary storage of the image data by the buffer 33 so that first-in first-out is performed in the buffer 33. The storage control section 66 controls the reading of the image data from the optical disc 32 of the drive 32 so that an overflow or an underflow does not occur in the buffer 33.

For example, when the amount of the data stored in the buffer 33 exceeds a threshold value for detecting an overflow, the storage control section 66 instructs the reading control section 71 to stop the reading of the data. The reading control section 71 that is instructed to stop the reading of the data causes the drive 32 to stop the reading of the data from the optical disc 32. If the decoder 34 is made to continue the decoding while the drive 32 stops the reading of the data from the optical disc 32, the amount of data stored in the buffer 33 decreases. Therefore, when the amount of data stored in the buffer 33 falls below a threshold value for detecting an underflow, the storage control section 66 instructs the reading control section 71 to restart the reading of the data. The reading control section 71 that is instructed to restart the reading of the data causes the drive 32 to restart the reading of the data from the optical disc 32. As described above, the storage control section 66 controls the storage of the buffer 33 so that an overflow or an underflow does not occur in the buffer 33.

The optical disc 31, a magnetic disk 81, an magneto-optical disc 82, a semiconductor memory 83 each have recorded thereon a program executed by the control section 36. The drive 32 reads a program from the loaded optical disc 31, magnetic disk 81, magneto-optical disc 82, or semiconductor memory 83, and supplies the read program to the control section 36. The program read from the optical disc 31, the magnetic disk 81, the magneto-optical disc 82, or the semiconductor memory 83 is stored in, for example, a ROM (Read Only Memory) (not shown) or a RAM (not shown) contained in the control section 36, and is executed by the control section 36.

A description will now be given below of a set composed of a plurality of combinations of the skip interval Ns and the number of consecutive frames Nh that correspond to the speed of a high-speed playback of a moving image, which is stored in the combination set storage section 64. The skip interval Ns and the number of consecutive frames Nh of the combination belonging to a set, which corresponds to a predetermined speed of a high-speed playback, are determined by considering playback speed constraint conditions, image quality constraint conditions, and data obtaining constraint conditions.

The playback speed constraint conditions are necessary conditions for realizing the speed of the high-speed playback. If the target speed is denoted as S1, in order to perform a high-speed playback at the speed S1, the skip interval Ns and the number of consecutive frames Nh need to satisfy equation (1):

$$Nh = Np/S1 \times Ns \quad (1)$$

The number of pictures Np indicates the number of pictures N contained in one GOP.

In other words, as the skip interval Ns and the number of consecutive frames Nh of one combination, integers that satisfy the relationship indicated by equation (1) and that are greater than 0 can be selected. The combinations of the skip interval Ns and the number of consecutive frames Nh that satisfy the relationship indicated by equation (1) and that are integers greater than 0 are innumerable.

That is, the playback speed constraint conditions are such that the skip interval Ns and the number of consecutive frames Nh of one combination satisfy the relationship indicated by equation (1) and that each of the skip interval Ns and the number of consecutive frames Nh of one combination is an integer greater than 0.

For example, when 15 pictures are contained in one GOP (when the number of pictures Np=15), in order to perform a high-speed playback at the speed S1 that is a 5× speed, since Nh=15/5×Ns, it is necessary that the skip interval Ns and the number of consecutive frames Nh of one combination satisfy Nh/Ns=15/5, that is, Nh/Ns=3/1 and each of them be an integer greater than 0.

Figure 5:
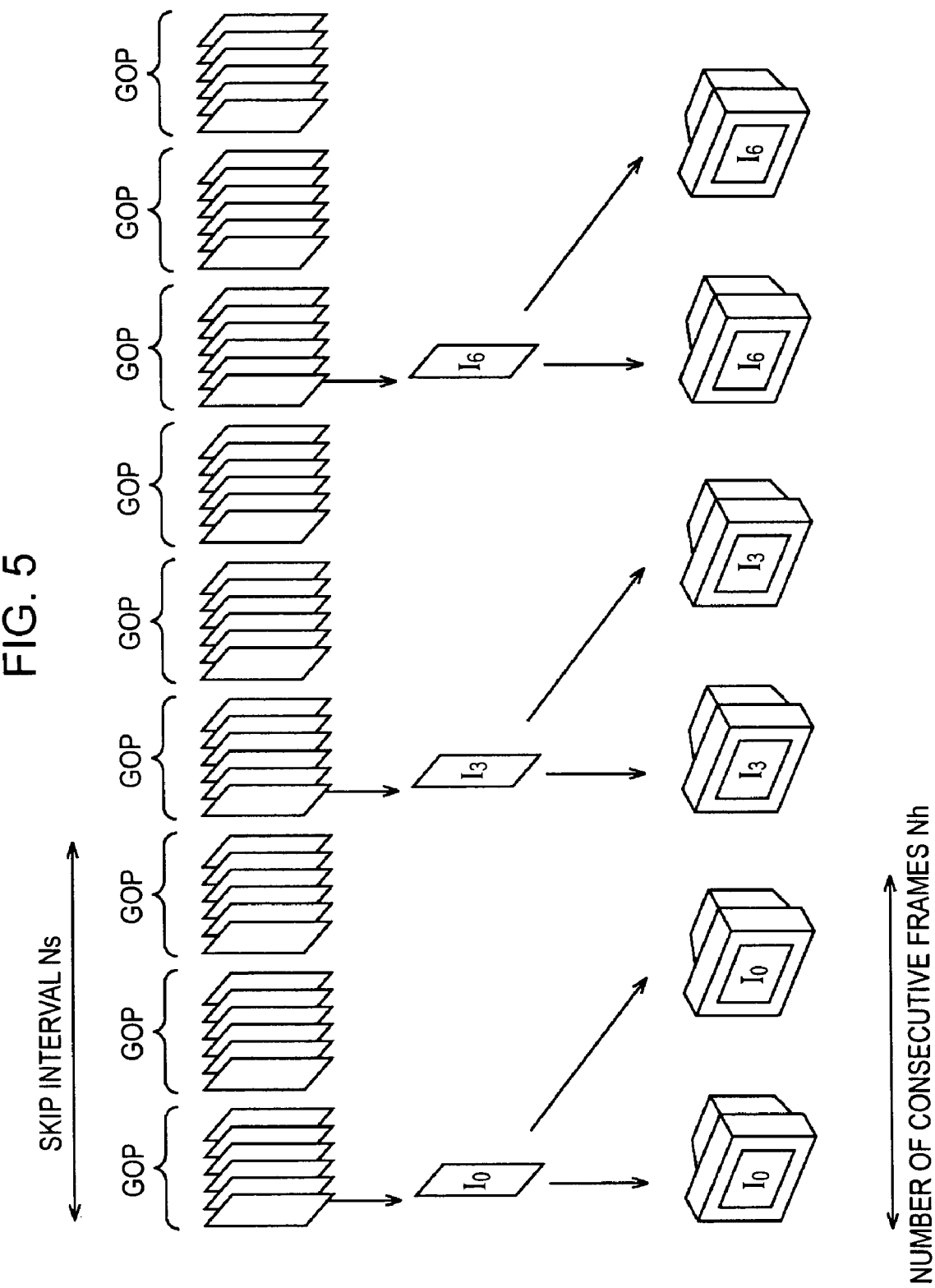
FIG. 5 shows the relationship between GOPs and a skip interval Ns and between frames and a number of consecutive frames Nh in a high-speed playback.

FIG. 7 shows an example of combination sets of the skip interval Ns and the number of consecutive frames Nh, which satisfy the playback speed constraint conditions. The combination on the right side, shown in FIG. 7, is formed of the skip interval Ns of 1, and the number of consecutive frames Nh of 3. When the number of pictures Np=15, the playback speed corresponding to this combination is Ns×Np/Nh, that is, 1×15/3=5× speed. Similarly, since the second combination from the left is composed of the skip interval Ns of 2 and the number of consecutive frames Nh of 6, the playback speed corresponding to this combination is 2×15/6=5× speed. Furthermore, since the third combination from the left is composed of the skip interval Ns of 3 and the number of consecutive frames Nh of 9, the playback speed corresponding to this combination is 3×15/9=5× speed. Furthermore, since the fourth combination from the left is composed of the skip interval Ns of 4 and the number of consecutive frames Nh of 12, the playback speed corresponding to this combination is 4×15/12=5× speed. In the manner described above, in each combination of the combination sets for performing a high-speed playback at the speed S1, which is a 5× speed, by using image data in which 15 pictures are contained in one GOP, shown in FIG. 5, the value of the number of the i-th (i is an integer greater than or equal to 1) consecutive frames Nhi is set at three times the value of the i-th skip interval Ns.

Next, the image quality constraint conditions will be described. The image quality constraint conditions are necessary conditions determined by the image quality displayed in a high-speed playback. It may be said that, when the skip interval Ns is large, the number of pictures that are not displayed with respect to one picture to be displayed becomes larger, and the information is lost from the image to be displayed. Therefore, when the skip interval Ns is too large, the number of scenes that are not displayed increases, and the possibility that the user is unable to find the target scene becomes high. Furthermore, if the number of consecutive frames Nh is large, the same image is displayed consecutively. The user feels that the still image is changed for each period of time, and it is difficult for the user to obtain a sense of reality that a high-speed playback is being performed.

That is, the skip interval Ns and the number of consecutive frames Nh need to be a range in which sufficient information (scenes) is contained and an image for which the user really feels a high-speed playback can be displayed. That is, it is necessary to determine the skip interval Ns and the number of consecutive frames Nh in the range in which the salability of the playback apparatus as a commodity is not deteriorated.

In the design stage of the playback apparatus, by considering the image quality constraint conditions, the range of the skip interval Ns and the number of consecutive frames Nh, that is, the range of the combination of the skip interval Ns and the number of consecutive frames Nh, is determined.

As described above, by considering the image quality constraint conditions, the range of the combination of the skip interval Ns and the number of consecutive frames Nh is determined in advance.

Next, the data obtaining constraint conditions will be described. The data obtaining constraint conditions are conditions determined by the data reading performance of the playback apparatus.

The data of an I picture has a larger amount of data than the data of a P picture or the data of a B picture. Therefore, if the skip interval Ns is too small, the amount of data per unit time, which is requested in a high-speed playback, sharply increases when compared to the amount of data per unit time, which is requested in a normal playback. That is, if the skip interval Ns is too small, the amount of the data that is needed to be read per unit time may exceed the performance of the drive 32.

Furthermore, if the skip interval Ns is small, the positions (intervals) on the optical disc 31 on which the data of an I picture to be read from the optical disc 31 is recorded become small. When the next data of an I picture is to be read after one piece of data of an I picture is read, the position of the next data of an I picture is gone too far, and it is necessary for the drive 32 to or perform a seek process or a process for a rotational delay, and it may take a longer time to read the data of an I picture. In such a case, in particular, when compared to the requested amount of the data of an I picture per unit time, the amount of the data of an I picture transferred in practice to the buffer 33 per unit time becomes smaller.

The reading from the buffer 33 by the decoder 34 can be performed at a high speed. Therefore, if the skip interval Ns is too small, the write transfer rate R0 at which the data of an I picture is read from the optical disc 31 and is transferred to the buffer 33 typically falls below the read transfer rate R1 at which data is transferred from the buffer 33 to the decoder 34.

Then, a state is reached in which the amount of the data stored in the buffer 33 typically falls below a threshold value for detecting an underflow, and it is difficult to continue the high-speed playback.

Therefore, it is necessary to determine the skip interval Ns so that the write transfer rate R0 at which the data of an I picture is read from the optical disc 31 and is transferred to the buffer 33 does not fall below the read transfer rate R1 at which data is transferred from the buffer 33 to the decoder 34.

As described above, the read transfer rate R1 that indicates the amount of image data transferred from the buffer 33 to the decoder 34 per unit time is determined by the amount of data of one piece of data of a picture, the frame rate, and the number of times in which the supply of the decoded image data to the display control section 35 is repeated. That is, the read transfer rate R1 varies depending on the number of consecutive frames Nh.

As described above, in order to avoid a state in which the amount of the data stored in the buffer 33 typically falls below a threshold value for detecting an underflow, the range of the skip interval Ns and the number of consecutive frames Nh is determined so that the write transfer rate R0 can exceed the read transfer rate R1.

For example, in the design stage of the playback apparatus, by considering the above-described data obtaining constraint conditions, the range of the skip interval Ns and the number of consecutive frames Nh, that is, the range of the combination of the skip interval Ns and the number of consecutive frames Nh, is determined.

As described above, by considering the data obtaining constraint conditions, the range of the combination of the skip interval Ns and the number of consecutive frames Nh is determined in advance.

When the surface of the optical disc 31 is damaged or a warp to such a degree that does not meet a standard occurs in the optical disc 31, it is difficult to read data from the optical disc 31 at an expected speed. As a result, the write transfer rate R0 is decreased. The data obtaining constraint conditions should not be determined by such exceptional conditions, and it is preferable that the range of the combination of the skip interval Ns and the number of consecutive frames Nh be determined by using the performance (rating) in the normal state of the playback apparatus as the data obtaining constraint conditions.

Figure 8:
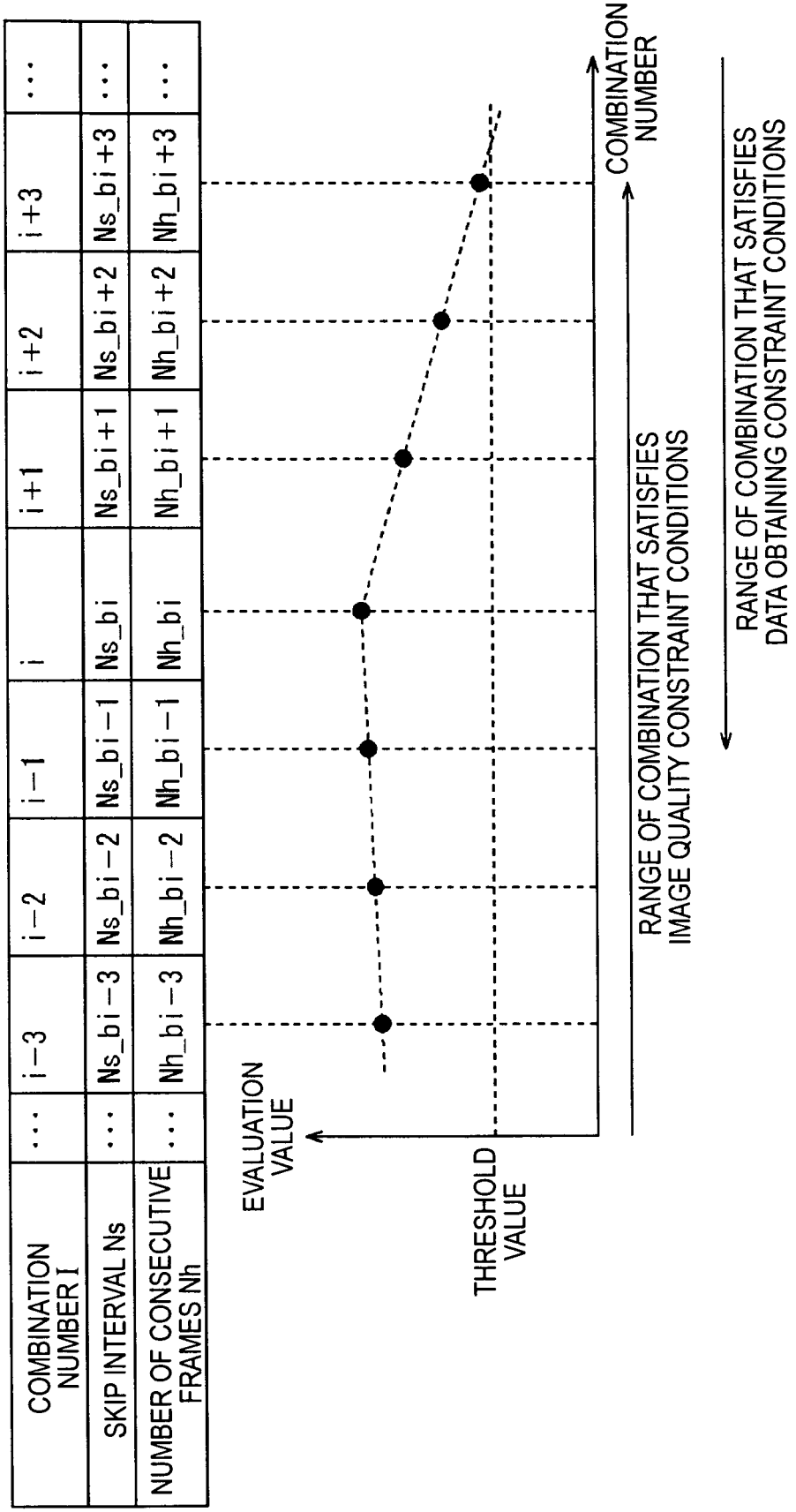
FIG. 8 shows an example of combination sets of a skip interval Ns and a number of consecutive frames Nh.
Figure 9:
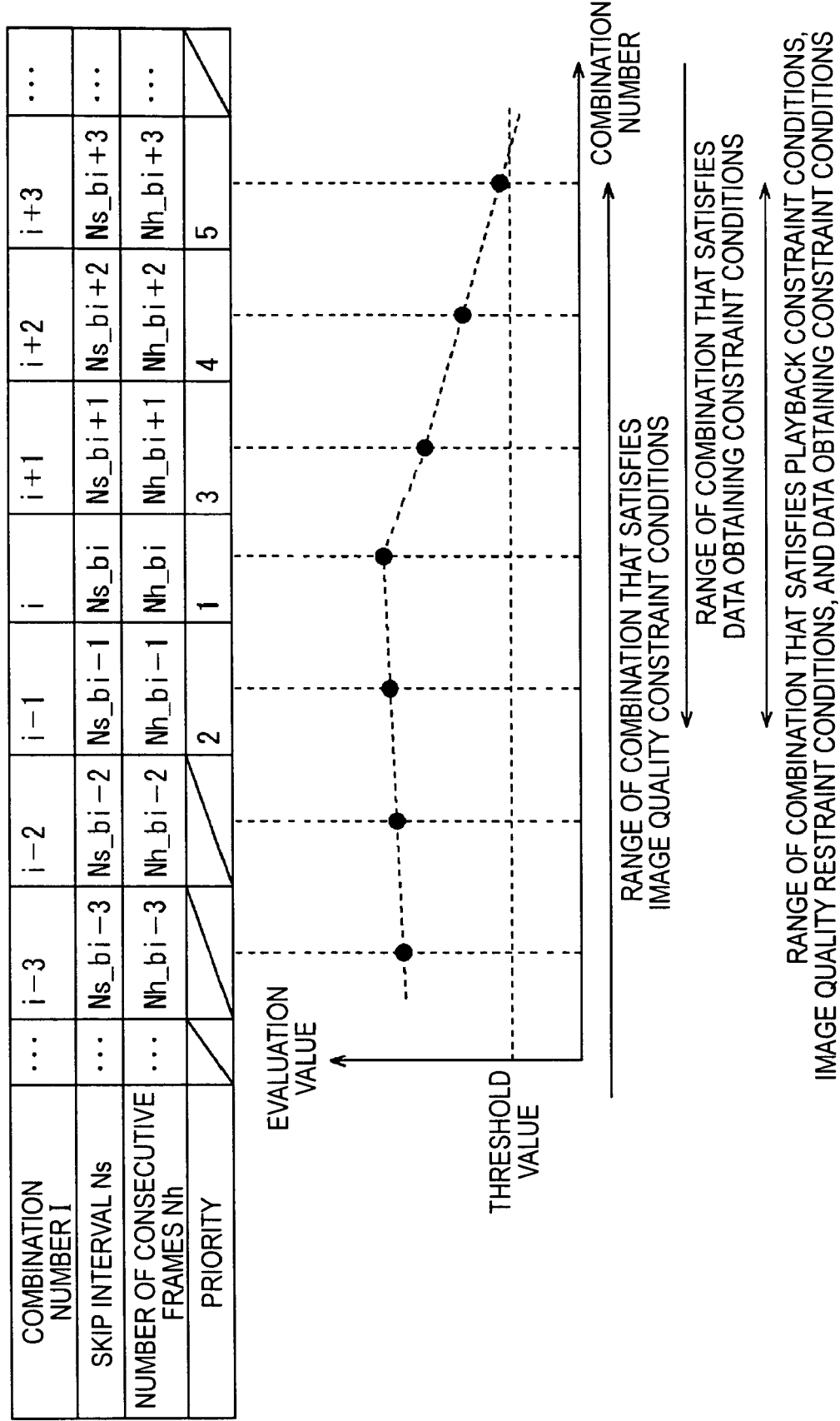
FIG. 9 shows an example of combination sets of a skip interval Ns and a number of consecutive frames Nh.
Figure 10:
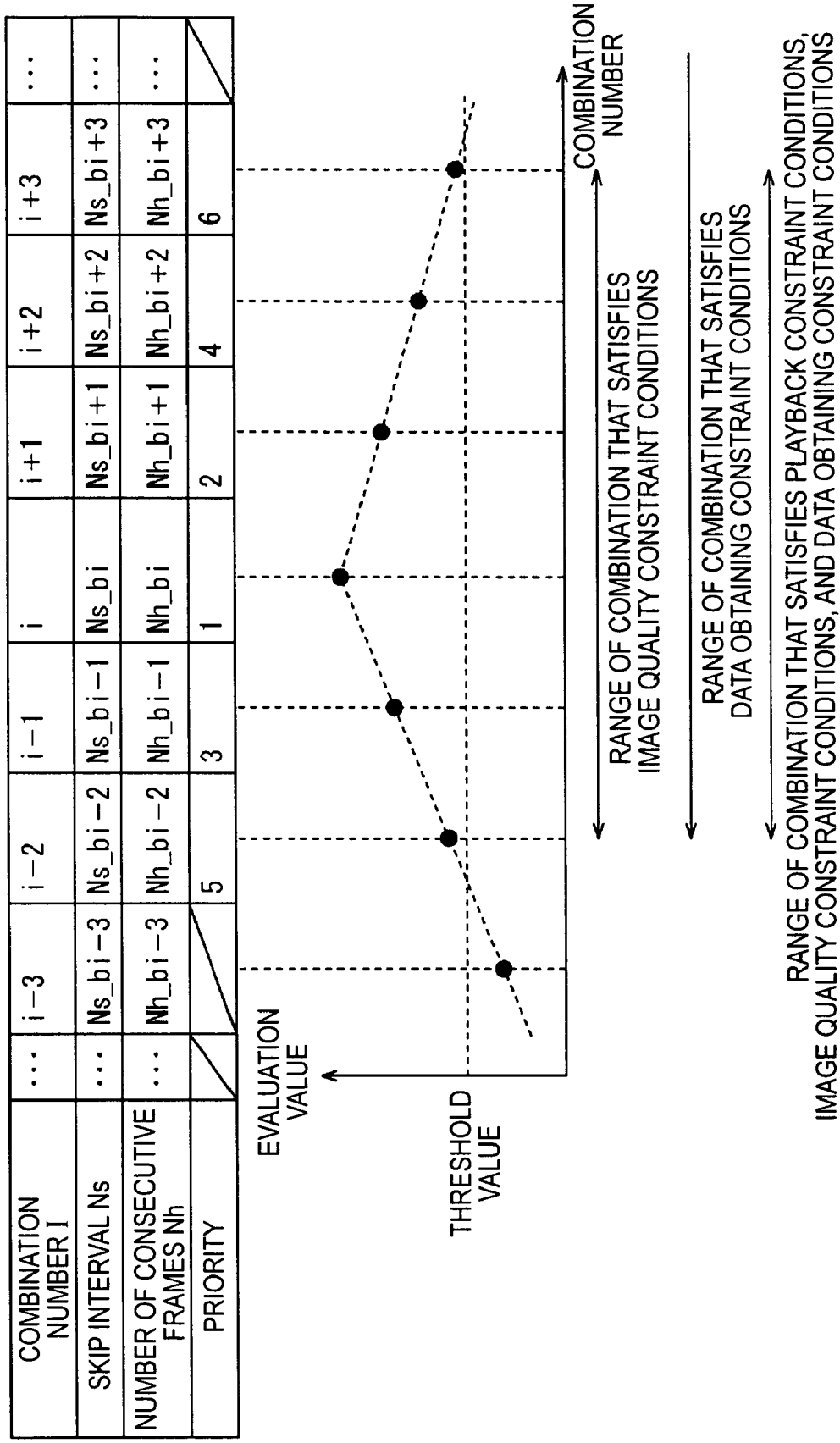
FIG. 10 shows an example of combination sets of a skip interval Ns and a number of consecutive frames Nh.

FIGS. 8 to 10 show examples of combination sets of the skip interval Ns and the number of consecutive frames Nh, which are determined by considering playback speed constraint conditions, image quality constraint conditions, and data obtaining constraint conditions.

First, the combination of the skip interval Ns and the number of consecutive frames Nh, which satisfy the playback speed constraint conditions, is determined. As shown in the upper portion of FIG. 8, by computing the skip interval Ns and the number of consecutive frames Nh that satisfy the relation of equation (1), the combination of the skip interval Ns and the number of consecutive frames Nh is determined. For example, the number of consecutive frames Nh that satisfies the relation of equation (1) is computed with respect to each of 1 to 10 skip intervals Ns. The corresponding computed skip interval Ns and number of consecutive frames Nh are made to be a combination of the skip interval Ns and the number of consecutive frames Nh that satisfy the playback speed constraint conditions.

A combination number I is attached to each of the combinations of the skip interval Ns and the number of consecutive frames Nh. The combination number I is set to a value that increases by 1 from 1 in the ascending order of the skip interval Ns (or the number of consecutive frames Nh). That is, a combination number I of 1 is attached to the combination of the skip interval Ns of 1. A combination number I of 2 is attached to the combination of the skip interval Ns of 2. A combination number I of one of 3 to m, which increases by 1 in the ascending order of the skip interval Ns, is attached to each of the combinations of the skip interval Ns of one of 3 to m.

Here, it may be said that the larger the combination number I of the skip interval Ns of the combination, that is, the larger the skip interval Ns, the smaller the read transfer rate R1 in the high-speed playback using the skip interval Ns.

As described above, combination sets of the skip interval Ns and the number of consecutive frames Nh, which satisfy the playback speed constraint conditions, is determined.

For example, as shown in FIG. 8, the skip interval Ns of the combination, to which the combination number I of i is attached, is Ns_bi, and the number of consecutive frames Nh to which the combination number I of i is attached, is Nh_bi. The skip interval Ns of the combination, to which the combination number I of one of i−1 to i−3 is attached, is one of Ns_bi−1 to Ns_bi−3, and the number of consecutive frames Nh, to which the combination number I of one of i−1 to i−3 is attached, is one of Nh_bi−1 to Nh_bi−3. Furthermore, the skip interval Ns of the combination, to which the combination number I of one of i+1 to i+3 is attached, is one of Ns_bi+1 to Ns_bi+3, and the number of consecutive frames Nh, to which the combination number I of one of i+1 to i+3 is attached, is one of Nh_bi+1 to Nh_bi+3.

Next, a combination that satisfies the image quality constraint conditions is extracted from the thus obtained combinations that satisfy the playback speed constraint conditions.

Initially, an evaluation value is attached to each of the combinations of the combination sets of the skip interval Ns and the number of consecutive frames Nh, which satisfy the playback speed constraint conditions.

This evaluation value is determined by the quality of the image displayed on the basis of the skip interval Ns and the number of consecutive frames Nh of the combination. For example, the image displayed on the basis of the skip interval Ns and the number of consecutive frames Nh of the combination is actually displayed, and the evaluation value is determined on the basis of the evaluation reference of the image. The evaluation value can be determined by considering, in addition to the quality of the image, the requirement (salability) of various types of functions, such as the ease of use (influence on the user) of the playback apparatus, such as the time until the high-speed playback is started.

In the lower portion of FIG. 8, an example of an evaluation value for each of the combinations is shown. In the lower portion of FIG. 8, the vertical direction indicates an evaluation value. A threshold value is determined in advance in such a manner as to correspond to the image quality constraint conditions. The threshold value is determined in such a manner that the combination for which an evaluation value higher than or equal to the threshold value is obtained satisfies the image quality constraint conditions.

For example, since the evaluation value attached to the combination, to which the combination number I of one of i−3 to i+3 is attached, is a threshold value or higher, the combination to which the combination number I of one of i−3 to i+3, is attached, satisfies the image quality constraint conditions. For example, the combination, to which the combination number I of i+4 or higher is attached, does not satisfy the image quality constraint conditions.

Next, a combination that satisfies the data obtaining constraint conditions is extracted from among the combinations that satisfy the playback speed constraint conditions and the image quality constraint conditions. For example, the playback apparatus is made to display an image on the basis of the skip interval Ns and the number of consecutive frames Nh of the combination that satisfies the playback speed constraint conditions and the image quality constraint conditions by using a plurality of optical discs 31 that satisfy the rating in order to check whether the display of the high-speed playback can be maintained. In this case, for example, the optical disc 31 having a warp within the range of the rating or the optical disc 31 on which image data whose amount of data per unit time is different is recorded, is used.

As shown in FIG. 9, a priority is attached in the descending order of the evaluation value with respect to the combination that satisfies the playback speed constraint conditions, the image quality constraint conditions, and the data obtaining constraint conditions. For example, as shown in FIG. 9, a priority of 1 is attached to the combination to which the combination number I of i, the highest evaluation value, is attached, from among the combinations that satisfy the playback speed constraint conditions, the image quality constraint conditions, and the data obtaining constraint conditions. A priority of 2 is attached to the combination to which the combination number I of i−1, the second highest evaluation value, is attached m. A priority of 3 is attached to the combination, to which the combination number I of i+1, the third highest evaluation value, is attached. A priority of 4 is attached to the combination, to which the combination number I of i+2, the fourth highest evaluation value, is attached. A priority of 5 is attached to the combination, to which the combination number I of i+3, the fifth highest evaluation value, is attached.

The case of this example shows that a priority with a smaller value is given more of a priority. It may also be shown that a priority with a greater value is given more of a priority.

In addition to a case in which the evaluation value at the skip interval Ns of a predetermined value becomes a maximum, the evaluation value at the skip interval Ns of a value smaller than that skip interval Ns decreases with respect to changes in the skip interval Ns at a low rate, and the evaluation value at the skip interval Ns of a value greater than the skip interval Ns at which the evaluation value becomes a maximum decreases with respect to changes in the skip interval Ns at a high rate, there is also a case in which the evaluation value at the skip interval Ns of a value smaller than the skip interval Ns at which the evaluation value becomes a maximum decreases with respect to changes in the skip interval Ns at a high rate, and the evaluation value at the skip interval Ns of a value greater than the skip interval Ns at which the evaluation value becomes a maximum decreases with respect to changes in the skip interval Ns at a high rate. For example, if the number of consecutive frames Nh becomes extremely small, there are cases in which the user becomes unable to recognize the displayed image, and the evaluation value decreases.

When the evaluation value at the skip interval Ns at a value smaller than the skip interval Ns at which the evaluation value becomes a maximum decreases with respect to changes in the skip interval Ns at a high rate, and the evaluation value at the skip interval Ns of a value greater than the skip interval Ns at which the evaluation value becomes a maximum decreases with respect to changes in the skip interval Ns at a high rate, for example, as shown in FIG. 10, among the combinations that satisfy the playback speed constraint conditions, the image quality constraint conditions, and the data obtaining constraint conditions, the highest evaluation value is attached to the combination to which the combination number I of i is attached; the second highest evaluation value is attached to the combination to which the combination number I of i+1 is attached; the third highest evaluation value is attached to the combination to which the combination number I of i−1 is attached; the fourth highest evaluation value is attached to the combination to which the combination number I of i+2 is attached; the fifth highest evaluation value is attached to the combination to which the combination number I of i−2 is attached; and the sixth highest evaluation value is attached to the combination to which the combination number I of i+3 is attached. In such a case, a priority of 1 is attached to the combination to which the combination number I of i is attached; a priority of 2 is attached to the combination to which the combination number I of i+1 is attached; a priority of 3 is attached to the combination to which the combination number I of i−1 is attached; a priority of 4 is attached to the combination to which the combination number I of i+2 is attached; a priority of 5 is attached to the combination to which the combination number I of i−2 is attached; and a priority of 6 is attached to the combination to which the combination number I of i+3 is attached.

Furthermore, the skip interval Ns of the combination to which the highest priority value (the priority indicating that the highest priority should be given) is attached is set as an initial value Ns_int of the skip interval Ns, and the number of consecutive frames Nh of the combination to which the highest priority is attached is set as an initial value Nh_int of the number of consecutive frames Nh.

For example, in the example shown in FIG. 9 or FIG. 10, the skip interval Ns_bi and the number of consecutive frames Nh_bi of the combination to which the combination number I of i is attached, to which the priority of 1 indicating that the highest priority should be given is attached, are set as an initial value Ns_int of the skip interval Ns and an initial value Nh_int of the number of consecutive frames Nh, respectively.

As described above, a set of a plurality of combinations of the skip interval Ns and the number of consecutive frames Nh, which satisfy the playback speed constraint conditions, the image quality constraint conditions, and the data obtaining constraint conditions and which correspond to the speed of the high-speed playback of the moving image, is stored in the combination set storage section 64. The combination number I and the priority are attached to each combination of the combination sets of the skip interval Ns and the number of consecutive frames Nh, which are stored in the combination set storage section 64.

In the example shown in FIG. 9, the combination sets of the skip interval Ns and the number of consecutive frames Nh, which is stored in the combination set storage section 64, does not contain the combination of the combination number I smaller than or equal to i−2 and the combination of the combination number I greater than or equal to i+4. In the example shown in FIG. 10, the combination sets of the skip interval Ns and the number of consecutive frames Nh, which are stored in the combination set storage section 64, do not contain the combination of the combination number I smaller than or equal to i−3 and the combination of the combination number I greater than or equal to i+4.

The combination set storage section 64 may store a set composed of combinations, to which a flag indicating whether or not the image quality constraint conditions are satisfied and a flag indicating whether or not the data obtaining constraint conditions are satisfied are attached, respectively, which are combinations of the skip interval Ns and the number of consecutive frames Nh, in which the value of the skip interval Ns is in a desired range, and which satisfy the playback speed constraint conditions.

Figure 11:
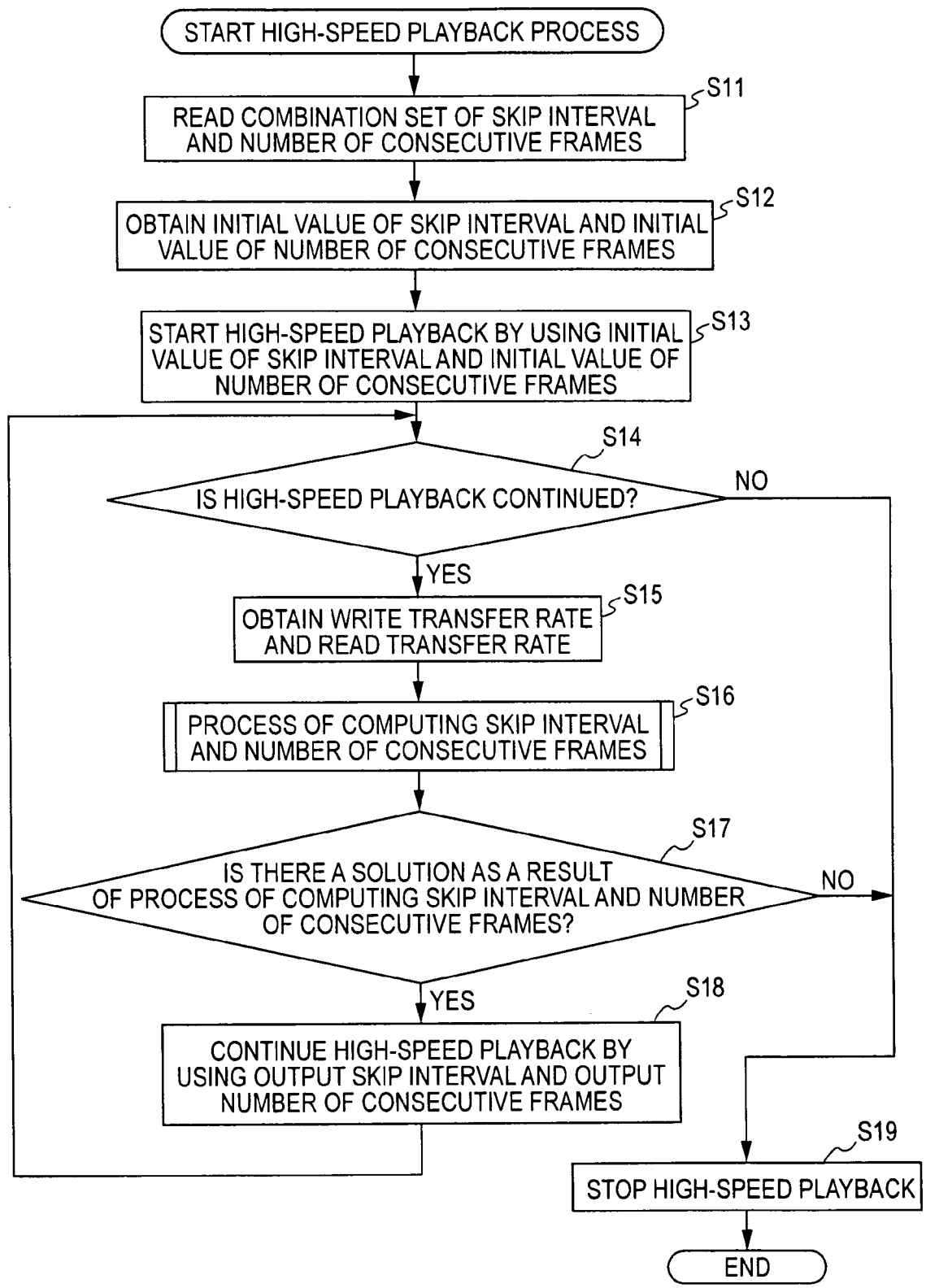
FIG. 11 is a flowchart illustrating a process of a high-speed playback.

A description will now be given, with reference to the flowchart in FIG. 11, of a high-speed playback process performed when a high-speed playback at a predetermined playback speed is instructed. In step S11, the selection section 63 of the control section 36 reads the prestored combination sets of the skip interval Ns and the number of consecutive frames Nh from the combination set storage section 64. That is, in response to a request from the selection section 63, the combination set storage section 64 supplies the prestored combination set of the skip interval Ns and the number of consecutive frames Nh to the selection section 63.

In step S12, the selection section 63 obtains the initial value Ns_int of the skip interval Ns and the initial value Nh_int of the number of consecutive frames Nh from the combination set of the read skip interval Ns and the read number of consecutive frames Nh. For example, in step S12, the selection section 63 sets the skip interval Ns of the combination to which the lowest priority value is attached (the highest priority is given) to an initial value Ns_int of the skip interval Ns and sets the number of consecutive frames Nh of the combination to which the highest priority is attached to an initial value Nh_int of the number of consecutive frames Nh. In the combination set of the skip interval Ns and the number of consecutive frames Nh, data that specifies the initial value Ns_int of the skip interval Ns and the initial value Nh_int of the number of consecutive frames Nh may be stored in advance. The selection section 63 supplies the obtained initial value Ns_int of the skip interval Ns and the obtained initial value Nh_int of the number of consecutive frames Nh to the high-speed playback control section 65.

In step S13, the high-speed playback control section 65 starts a high-speed playback by using the initial value Ns_int of the skip interval Ns and the initial value Nh_int of the number of consecutive frames Nh. For example, the reading control section 71 of the high-speed playback control section 65 controls the obtainment of image data of the drive 32 so that the first data of an I picture is obtained from the GOP at the beginning among the GOPs of the number of the initial value Ns_int of the skip interval Ns for each number of GOPs of the initial value Ns_int of the skip interval Ns. Furthermore, on the basis of the initial value Nh_int of the number of consecutive frames Nh, the decoding control section 72 of the high-speed playback control section 65 controls the output of the decoder 34 so that the result of the decoding of one piece of data of a picture is repeatedly output to the display control section 35 for the number of times of the value of the initial value Nh_int of the number of consecutive frames Nh.

In step S14, the control section 36 determines whether or not a high-speed playback should be continued on the basis of a signal from the input section (not shown) in accordance with an instruction from the user. When it is determined in step S14 that the high-speed playback should be continued, the process proceeds to step S15, where the transfer rate monitoring section 61 obtains the write transfer rate R0 that indicates the amount of data of the image data, which is written into the buffer 33, for displaying a moving image per unit time, and also obtains the read transfer rate R1 that indicates the amount of data of the image data, which is read from the buffer 33, for displaying a moving image per unit time. The transfer rate monitoring section 61 supplies the data indicating the write transfer rate R0 and the read transfer rate R1 to the determination section 62.

In step S16, the process of computing the skip interval and the number of consecutive frames is performed. The details of the process of computing the skip interval and the number of consecutive frames will be described later.

The process of step S16 can be realized as a function in which the write transfer rate R0 and the read transfer rate R1 are arguments (inputs) and the skip interval Ns and the number of consecutive frames Nh are outputs.

In step S17, the high-speed playback control section 65 determines whether or not there is a solution as a result of the process of computing the skip interval and the number of consecutive frames. When it is determined that there is a solution, since a high-speed playback can be continued, the process proceeds to step S18, where the high-speed playback control section 65 continues the high-speed playback by using the skip interval Ns and the number of consecutive frames Nh that are output as a result of the process of computing the skip interval and the number of consecutive frames. The process then returns to step S14, and the above-described process is repeated. For example, in step S18, the reading control section 71 of the high-speed playback control section 65 controls the obtainment of the image data from the drive 32 so that the first data of an I picture is obtained from the GOP at the beginning among the GOPs of the output skip interval Ns for each number of GOPs of the output skip interval Ns. Furthermore, on the basis of the output number of consecutive frames Nh, the decoding control section 72 of the high-speed playback control section 65 controls the output of the decoder 34 so that the result of the decoding of one piece of data of a picture is repeatedly output to the display control section 35 for the number of times of the value of the output number of consecutive frames Nh.

When it is determined in step S17 that there is no solution, since it is difficult to continue the high-speed playback, the process proceeds to step S19, where the high-speed playback control section 65 stops the high-speed playback, and the processing is then completed. That is, the reading of the image data by the drive 32 and the output of the decoder 34 are stopped.

When the high-speed playback is temporarily stopped and the amount of the data stored in the buffer 33 exceeds a threshold value for detecting an overflow in step S19, the process of the high-speed playback may be restarted. In this case, the high-speed playback is restarted by using the skip interval Ns and the number of consecutive frames Nh when the high-speed playback is temporarily stopped.

When it is determined in step S14 that the high-speed playback should not be continued, since stoppage is instructed from the user, the process proceeds to step S19, where the high-speed playback control section 65 stops the high-speed playback, and the processing is then completed.

Figure 12:
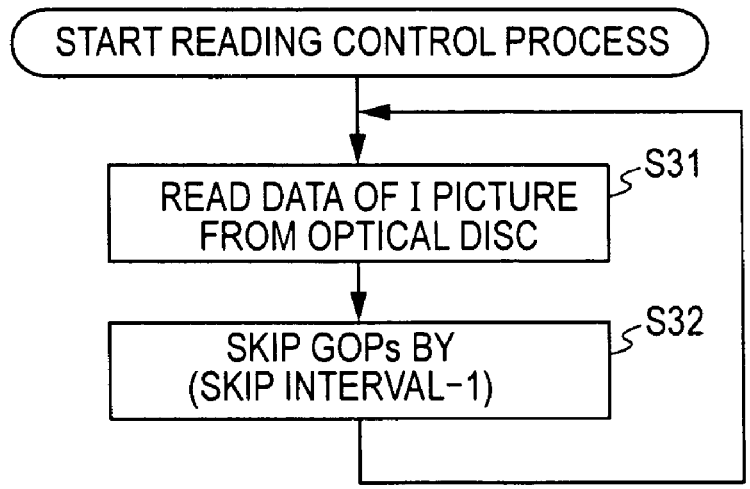
FIG. 12 is a flowchart illustrating a reading control process.

FIG. 12 is a flowchart illustrating a reading control process by the reading control section 71 in a high-speed playback. In step S31, the reading control section 71 causes the drive 32 to read the first one piece of data of an I picture from one GOP and to supply the read data of an I picture to the buffer 33.

In step S32, the reading control section 71 causes the drive 32 to skip the reading of the GOP by the number of (skip interval Ns−1). The process then returns to step S31, and the processing is repeated.

As described above, the reading control section 71 causes the drive 32 to read the first data of an I picture from the GOP at the beginning among the GOPs for each number of GOPs of the skip intervals Ns, which is output from the selection section 63.

Figure 13:
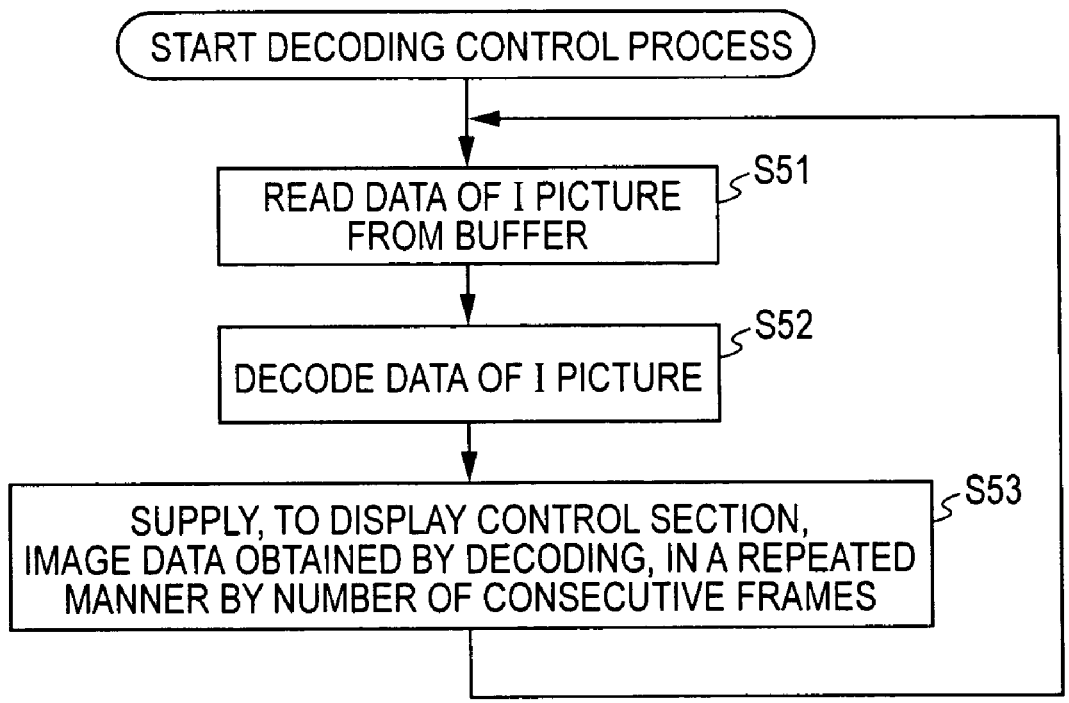
FIG. 13 is a flowchart illustrating a decoding control process.

FIG. 13 is a flowchart illustrating a decoding control process by the decoding control section 72 in a high-speed playback. In step S51, the decoding control section 72 causes the encoder 34 to read one piece of data of an I picture from the buffer 33. In step S52, the decoding control section 72 causes the encoder 34 to decode the data of an I picture.

In step S53, the decoding control section 72 causes the encoder 34 to supply, to the display control section 35, the image data obtained by decoding in a repeated manner by the number of consecutive frames Nh at an interval in accordance with the frame rate. The process then returns to step S51, and the above-described process is repeated.

As described above, the decoding control section 72 causes the encoder 34 to output the result of the decoding of one piece of data of a picture to the display control section 35 in a repeated manner by the number of consecutive frames Nh output from the selection section 63.

Figure 14:
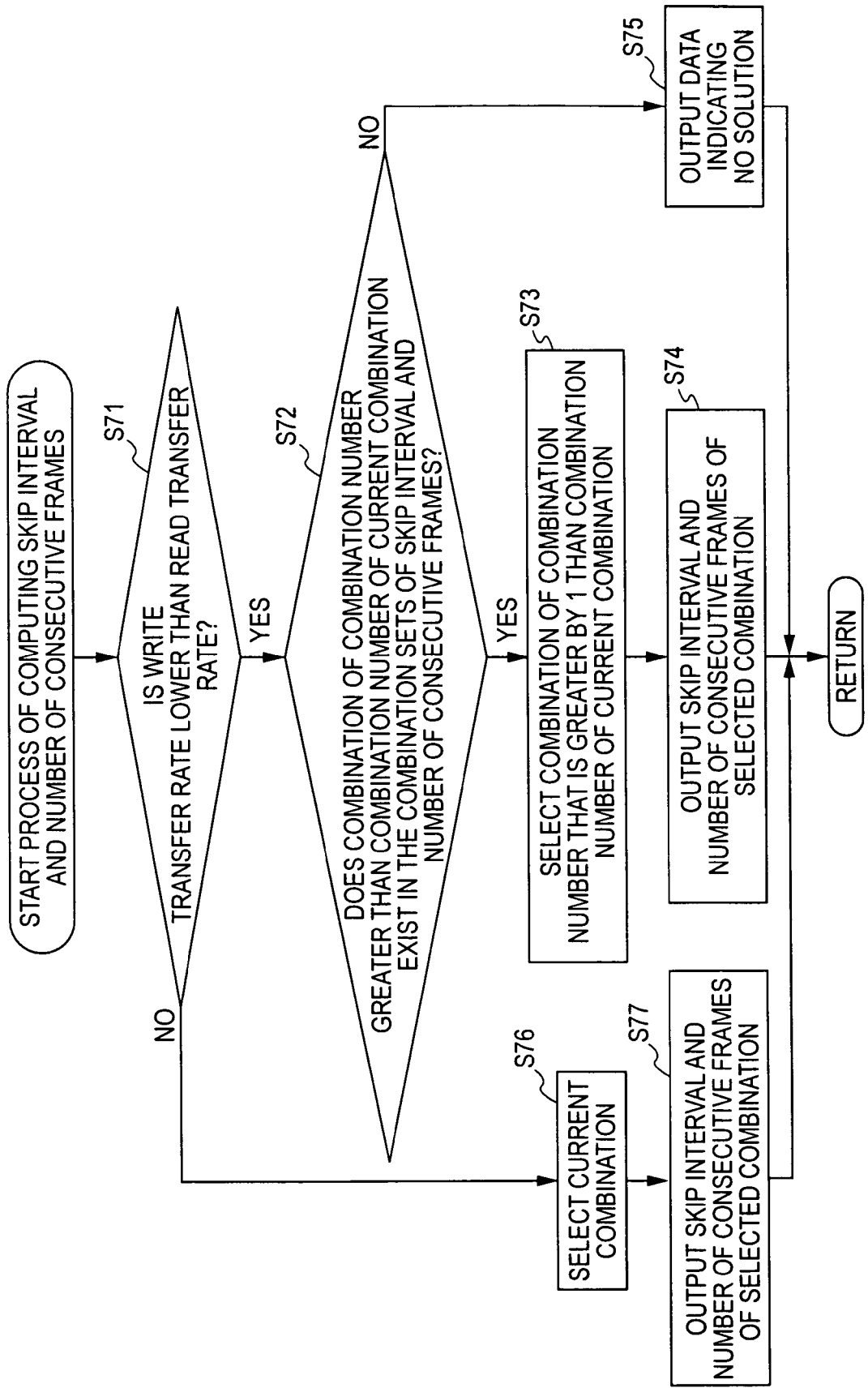
FIG. 14 is a flowchart illustrating a process of computing a skip interval and a number of consecutive frames.

Next, a description will be given, with reference to the flowchart in FIG. 14, of details of the process, which corresponds to the process of step S16 of FIG. 11, of computing the skip interval and the number of consecutive frames.

In step S71, on the basis of the data indicating the write transfer rate R0 and the read transfer rate R1, which is supplied from the transfer rate monitoring section 61, the determination section 62 determines whether or not the write transfer rate R0 is lower than the read transfer rate R1.

In step S71, the determination section 62 may determine whether or not the state in which the write transfer rate R0 is lower than the read transfer rate R1 is continued for a preset period of time. Furthermore, in step S71, the determination section 62 may determine whether or not the write transfer rate R0 is lower than the read transfer rate R1 and whether or not the absolute value of the difference between the write transfer rate R0 and the read transfer rate R1 is a preset threshold value or higher. This applies the same for the process of determining the relationship between the write transfer rate R0 and the read transfer rate R1, which will be described later with reference to FIG. 15 or FIG. 16.

The determination section 62 supplies the data indicating the determination result to the selection section 63.

When it is determined in step S71 that the write transfer rate R0 is lower than the read transfer rate R1, there is a risk that it is difficult to continue the high-speed playback for an exceptional factor, that is, there is a risk that an underflow occurs continuously in the buffer 33. Therefore, in order to perform a high-speed playback by using the skip interval Ns and the number of consecutive frames Nh for which the amount of data is difficult to reduce, the process proceeds to step S72. In this step, the selection section 63 determines whether or not the combination of the combination number I greater than the combination number I of the current combination exists in the combination set of the skip interval Ns and the number of consecutive frames Nh, which is read from the combination set storage section 64. For example, in step S72, when the high-speed playback is performed by using the skip interval Ns and the number of consecutive frames Nh of the combination of the combination number I of i, the selection section 63 determines whether or not the combination of the combination number I, such as i+1 or i+2, exists in the combination sets.

When it is determined in step S72 that the combination of the combination number I greater than the combination number I of the current combination exists, since the combination of the skip interval Ns and the number of consecutive frames Nh for which the amount of the data stored in the buffer 33 is difficult to reduce exists in the set, the process proceeds to step S73. In this step, the selection section 63 select the combination of the combination number I that is greater by 1 than the combination number I of the current combination from the combination sets of the skip interval Ns and the number of consecutive frames Nh. For example, when the high-speed playback is performed by using the skip interval Ns and the number of consecutive frames Nh of the combination of the combination number I of i, when the combination of the combination number I, such as i+1 or i+2, exists in the combination sets, the selection section 63 select the combination of the combination number I of i+1 that is greater by 1 than the combination number I of i.

In step S74, the selection section 63 supplies the skip interval Ns and the number of consecutive frames Nh of the selected combination to the high-speed playback control section 65, and the processing is then completed.

On the other hand, when it is determined in step S72 that the combination of the combination number I greater than the combination number I of the current combination does not exist in the combination set of the skip interval Ns and the number of consecutive frames Nh, the combination of the skip interval Ns and the number of consecutive frames Nh for which the amount of the data stored in the buffer 33 is difficult to reduce does not exist in the set, and therefore, the process proceeds to step S75. In this step, the selection section 63 supplies data indicating no solution to the high-speed playback control section 65, and the processing is then completed.

When the combination sets of the skip interval Ns and the number of consecutive frames Nh, shown in FIG. 9, are stored in the combination set storage section 64, when the combination number I of the current combination is i+3, the combination of the skip interval Ns and the number of consecutive frames Nh, which is a combination of the combination number I greater than the combination number I of i+3 and which satisfy the image quality constraint conditions, does not exist. Therefore, data indicating no solution is supplied to the high-speed playback control section 65, so that the high-speed playback is stopped (or is temporarily stopped).

When it is determined in step S71 that the write transfer rate R0 is not lower than the read transfer rate R1, there is no risk that an underflow occurs continuously in the buffer 33. Therefore, the process proceeds to step S76, where the selection section 63 selects the current combination from the combination set of the skip interval Ns and the number of consecutive frames Nh. For example, when the high-speed playback is performed by using the skip interval Ns and the number of consecutive frames Nh of the combination of the combination number I of i, the selection section 63 selects the combination of the combination number I of i.

In step S77, the selection section 63 supplies the skip interval Ns and the number of consecutive frames Nh of the selected combination to the high-speed playback control section 65, and the processing is then completed.

As described above, when there is the risk that an underflow occurs continuously in the buffer 33, the skip interval Ns and the number of consecutive frames Nh by which the amount of data is difficult to reduce, that is, by which the read transfer rate R1 is decreased more, are selected, and the high-speed playback is performed by using the selected skip interval Ns and the selected number of consecutive frames Nh. Since the process of step S16 is repeatedly performed, when the state in which the write transfer rate R0 is lower than the read transfer rate R1 continues, the combination of a larger combination number I is selected, and the read transfer rate R1 is reduced further.

That is, the combination of the skip interval Ns and the number of consecutive frames Nh is searched for so that the read transfer rate R1 is lower than the write transfer rate R0 while the skip interval Ns and the number of consecutive frames Nh are changed.

When the combination set storage section 64 stores a set composed of combinations of the skip interval Ns and the number of consecutive frames Nh, in which the value of the skip interval Ns is in a desired range and which satisfy the playback speed constraint conditions, to which a flag indicating whether or not the image quality constraint conditions are satisfied and a flag indicating whether or not the data obtaining constraint conditions are satisfied are attached, respectively, in step S72, on the basis of the flag indicating whether or not the image quality constraint conditions are satisfied and the flag indicating whether or not the data obtaining constraint conditions are satisfied, which are attached to each combination, the selection section 63 determines whether or not the combination of the combination number I greater than the combination number I of the current combination, which satisfies the image quality constraint conditions and the data obtaining constraint conditions, exists in the combination set of the skip interval Ns and the number of consecutive frames Nh.

Furthermore, the combination may be selected by referring to the priority.

Figure 15:
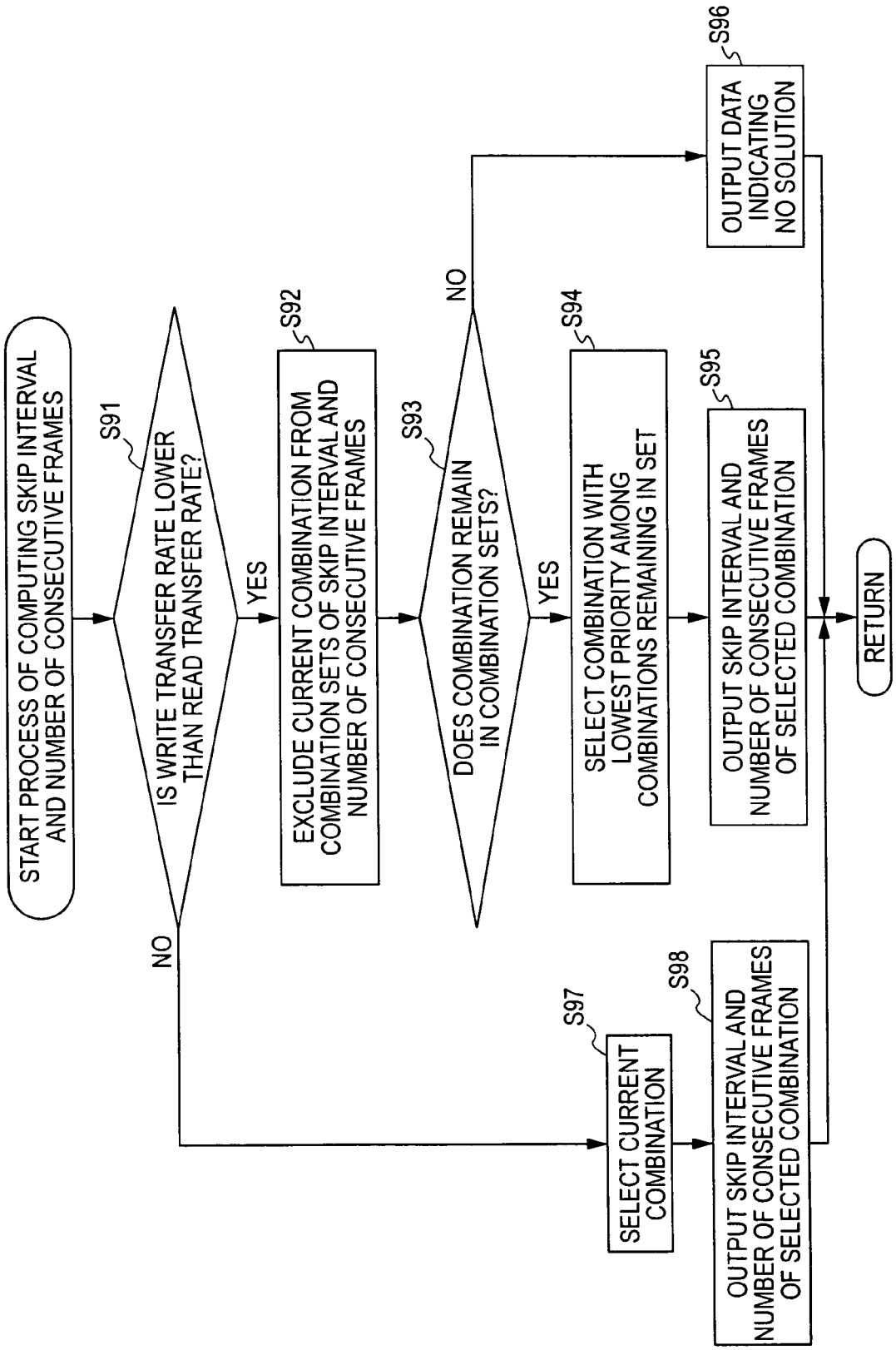
FIG. 15 is a flowchart illustrating a process of computing a skip interval and a number of consecutive frames.

A description will now be given, with reference to the flowchart in FIG. 15, of details of another process, which corresponds to the process of step S16 of FIG. 11, of computing a skip interval and a number of consecutive frames for selecting a combination by referring to a priority.

In step S91, the determination section 62 determines whether or not the write transfer rate R0 is lower than the read transfer rate R1 on the basis of the write transfer rate R0 and the read transfer rate R1, which are supplied from the transfer rate monitoring section 61. The determination section 62 supplies the data indicating the result of the determination to the selection section 63.

When it is determined in step S91 that the write transfer rate R0 is lower than the read transfer rate R1, the process proceeds to step S92, where the selection section 63 excludes (deletes) the current combination from the combination sets of the skip interval Ns and the number of consecutive frames Nh, which are stored at the current point of time. That is, the process proceeds to step S92, where the selection section 63 deletes the current combination from the combination sets of the skip interval Ns and the number of consecutive frames Nh.

In step S93, the selection section 63 determines whether or not a combination remains in the stored combination sets of the skip interval Ns and the number of consecutive frames Nh. In other words, in step S93, the selection section 63 determines whether or not the stored combination sets of the skip interval Ns and the number of consecutive frames Nh are empty.

When it is determined in step S93 that the combination remains in the combination sets, the process proceeds to step S94, where the selection section 63 selects the combination with the lowest priority value, that is, the combination that should be given the highest priority, from the combination sets of the skip interval Ns and the number of consecutive frames Nh. For example, when the combination to which the priority of 3 or 4 is attached exists in the combination sets, the selection section 63 selects the combination to which the priority of 3 is attached.

In step S95, the selection section 63 supplies the skip interval Ns and the number of consecutive frames Nh of the selected combination to the high-speed playback control section 65, and the processing is then completed.

On the other hand, when it is determined in step S93 that the combination does not remain in the combination sets, since no combination exists in the set (since the sets are empty), the process proceeds to step S96, where the selection section 63 supplies data indicating no solution to the high-speed playback control section 65, and the processing is then completed.

When it is determined in step S91 that the write transfer rate R0 is not lower than the read transfer rate R1, the process proceeds to step S97, where the selection section 63 select the current combination from the combination sets of the skip interval Ns and the number of consecutive frames Nh.

In step S98, the selection section 63 supplies the skip interval Ns and the number of consecutive frames Nh of the selected combination to the high-speed playback control section 65, and the processing is then completed.

As described above, when there is the risk that an underflow occurs continuously in the buffer 33, the skip interval Ns and the number of consecutive frames Nh are selected on the basis of the priority, and the high-speed playback is performed by using the selected skip interval Ns and the selected number of consecutive frames Nh. Since the process of step S16 is repeatedly performed, when the state in which the write transfer rate R0 is lower than the read transfer rate R1 continues, the combination that is given the next high priority is selected.

According to the process described with reference to the flowchart of FIG. 15, the combination of the skip interval Ns and the number of consecutive frames Nh is searched for so that the read transfer rate R1 is lower than the write transfer rate R0 while the skip interval Ns and the number of consecutive frames Nh are changed.

Furthermore, when the write transfer rate R0 is higher than the read transfer rate R1, an image with a higher (better) quality can also be displayed.

Figure 16:
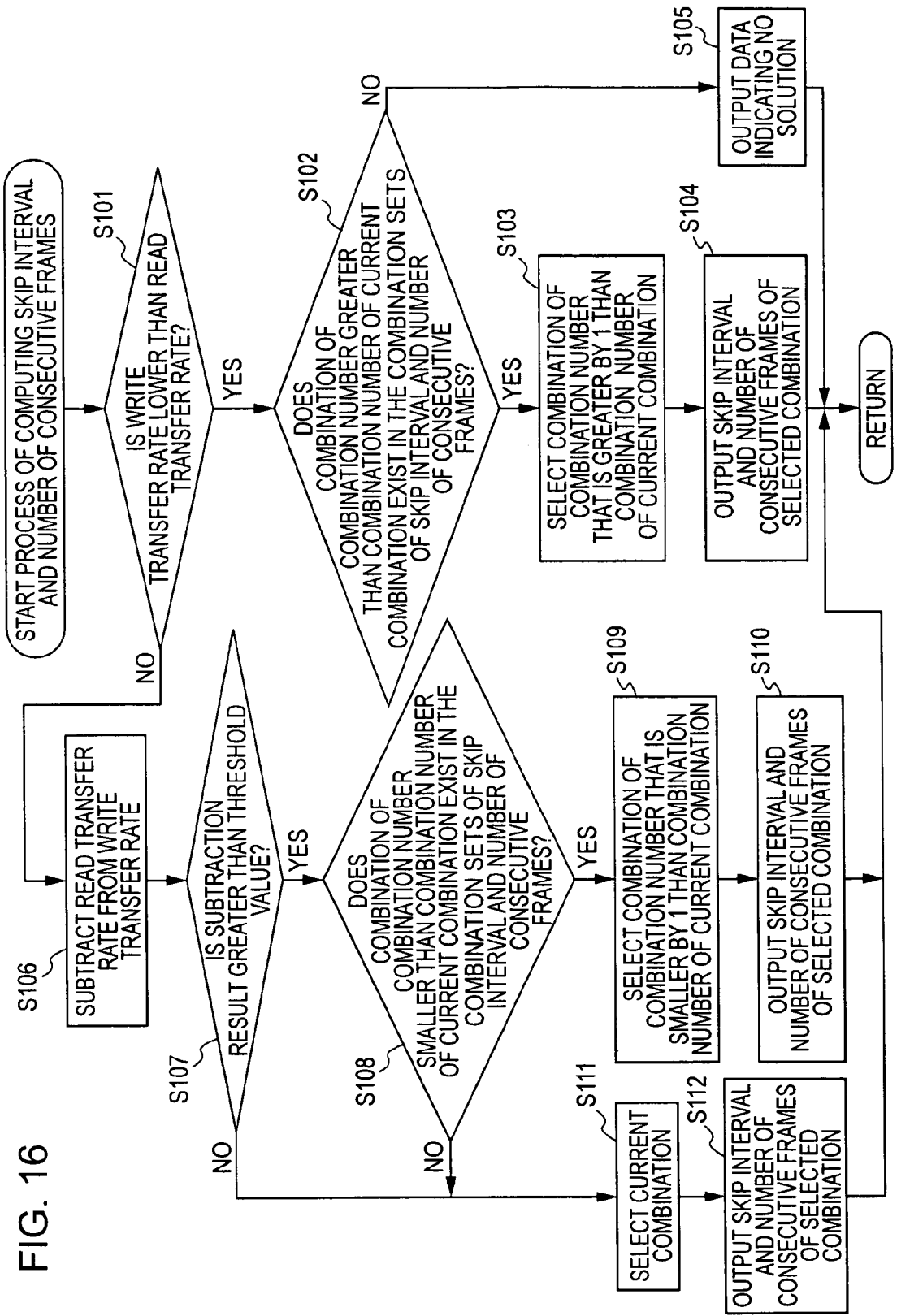
FIG. 16 is a flowchart illustrating a process of computing a skip interval and a number of consecutive frames.

Next, a description will be given, with reference to the flowchart in FIG. 16, of details of another process, which corresponds to the process of step S16 of FIG. 11, of computing a skip interval and a number of consecutive frames for displaying a higher quality image when the write transfer rate R0 is higher than the read transfer rate R1.

Each process of steps S101 to S105 is identical to each process of steps S71 to S75, and accordingly, descriptions thereof are omitted.

When it is determined in step S101 that the write transfer rate R0 is not lower than the read transfer rate R1, the process proceeds to step S106, where the selection section 63 subtracts the read transfer rate R1 from the write transfer rate R0. In step S107, the selection section 63 determines whether or not the result of the subtraction is greater than a preset threshold value. When it is determined in step S107 that the result of the subtraction is greater than the preset threshold value, that is, when the write transfer rate R0 is higher than the read transfer rate R1 and the difference between the write transfer rate R0 and the read transfer rate R1 is greater than the threshold value, the process proceeds to step S108. In this step, the selection section 63 determines whether or not the combination of the combination number I smaller than the combination number I of the current combination exists in the combination sets of the skip interval Ns and the number of consecutive frames Nh, which are read from the combination set storage section 64. For example, when the high-speed playback is performed by using the skip interval Ns and the number of consecutive frames Nh of the combination number I of i+2, in step S108, the selection section 63 determines whether or not the combination of the combination number I, such as i+1 or i, smaller than i+2 exists in the combination sets.

When it is determined in step S108 that the combination of the combination number I smaller than the combination number I of the current combination exists, since the combination of the skip interval Ns and the number of consecutive frames Nh, by which a higher (better) quality image is displayed, exists in the set, the process proceeds to step S109. In this step, the selection section 63 selects the combination of the combination number I smaller by 1 than the combination number I of the current combination from the combination sets of the skip interval Ns and the number of consecutive frames Nh. For example, when the high-speed playback is performed by using the skip interval Ns and the number of consecutive frames Nh of the combination of the combination number I of i+2, when the combination of the combination number I, such as i+1 or i, exists in the combination sets, the selection section 63 selects the combination of the combination number I of i+1 that is smaller by 1 than the combination number I of i+2.

In step S110, the selection section 63 supplies the skip interval Ns and the number of consecutive frames Nh of the selected combination to the high-speed playback control section 65, and the processing is then completed.

On the other hand, when it is determined in step S107 that the result of the subtraction is not greater than the preset threshold value or when it is determined in step S108 that the combination of the combination number I smaller by 1 than the combination number I of the current combination does not exist, the process proceeds to step S111. In this step, the selection section 63 selects the current combination from the combination sets of the skip interval Ns and the number of consecutive frames Nh.

In step S112, the selection section 63 supplies the skip interval Ns and the number of consecutive frames Nh of the selected combination to the high-speed playback control section 65, and the processing is then completed.

As described above, when there is a risk that an underflow occurs continuously in the buffer 33, the skip interval Ns and the number of consecutive frames Nh by which the amount of data is difficult to reduce, that is, by which the read transfer rate R1 is reduced further, are selected, and a high-speed playback is performed by using the selected skip interval Ns and the selected number of consecutive frames Nh. On the contrary, when the write transfer rate R0 is higher than the read transfer rate R1, the skip interval Ns and the number of consecutive frames Nh, by which a better (higher) quality image is displayed, are selected, and a high-speed playback is performed by using the selected skip interval Ns and the selected number of consecutive frames Nh.

That is, a better (higher) quality image can be displayed at the point of time at which a larger amount of image data can be read from the optical disc 31 while the high-speed playback is being continued.

According to the process described with reference to the flowchart of FIG. 16, the combination of the skip interval Ns and the number of consecutive frames Nh is searched for so that the read transfer rate R1 is lower than the write transfer rate R0 while the skip interval Ns and the number of consecutive frames Nh are changed.

An average read transfer rate R1ave may be attached to each of the combinations of a set composed of a plurality of combinations of the skip interval Ns and the number of consecutive frames Nh, which satisfy the playback speed constraint conditions, the image quality constraint conditions, and the data obtaining constraint conditions and which correspond to the speed of the high-speed playback of the moving image, so that the combination of the skip interval Ns and the number of consecutive frames Nh may be selected from the set on the basis of the average read transfer rate R1ave attached to each of the combinations.

FIG. 17 illustrates an example of combination sets, to which the average read transfer rate R1ave is attached to each of the combinations, which are combination sets of the skip interval Ns and the number of consecutive frames Nh that are determined by considering the playback speed constraint conditions, the image quality constraint conditions, and the data obtaining constraint conditions.

An average read transfer rate R1ave (I) is attached to the combination of the combination number I. The average read transfer rate R1ave (I) is an average value of the read transfer rate R1 when image data is read from the standard optical disc 31 (the optical disc 31 in compliance with the standard) by using the skip interval Ns and the number of consecutive frames Nh of the combination of the combination number I. For example, by using the skip interval Ns and the number of consecutive frames Nh of the combination of the combination number I, the read transfer rate R1 when image data is read from the optical disc 31 in compliance with the standard is actually measured for one or plural pieces of the image data, the average value is determined, and the average value is set as the average read transfer rate R1ave (I).

In the example shown in FIG. 17, an average read transfer rate R1ave (i−1) is attached to the combination of the combination number I of i−1. For example, by using the skip interval Ns_bi−1 and the number of consecutive frames Nh_bi−1, the read transfer rate R1 when image data is read from the optical disc 31 in compliance with the standard is actually measured for one or plural pieces of the image data, the average value is determined, and the average value is set as the average read transfer rate R1ave (i−1). The average read transfer rate R1ave (i−1) determined in this manner is attached to the combination of the combination number I of i−1.

An average read transfer rate R1ave (i) is attached to the combination of the combination number I of i. For example, by using the skip interval Ns_bi and the number of consecutive frames Nh_bi, the read transfer rate R1 when image data is read from the optical disc 31 in compliance with the standard is actually measured for one or plural pieces of the image data, the average value is determined, and the average value is set as the average read transfer rate R1ave (i). The average read transfer rate R1ave (i) determined in this manner is attached to the combination of the combination number I of i.

Similarly, the average read transfer rates R1ave (i+1) to (i+3) are attached to the combinations of the combination numbers I, which are i+1 to i+3, respectively.

In the example shown in FIG. 17, the combination sets of the skip interval Ns and the number of consecutive frames Nh, which are stored in the combination set storage section 64, do not contain the combination of the combination number I smaller than or equal to i−2 and the combination of the combination number I greater than or equal to i+4.

Figure 18:
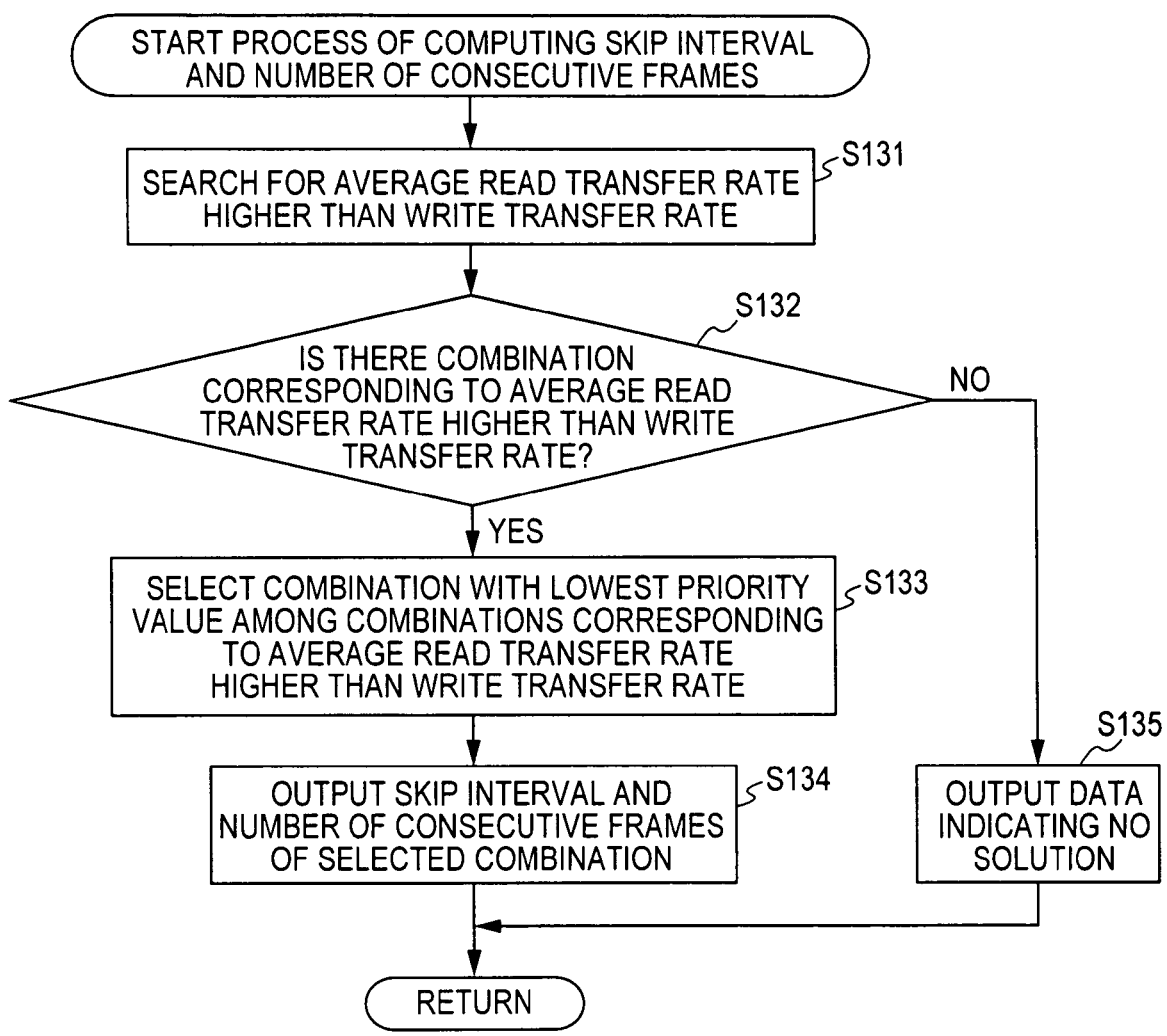
FIG. 18 is a flowchart illustrating a process of computing a skip interval and a number of consecutive frames.

Next, a description will be given, with reference to the flowchart in FIG. 18, of details of still another process, which corresponds to the process of step S16 of FIG. 11, of computing a skip interval and a number of consecutive frames, for selecting the combination of the skip interval Ns and the number of consecutive frames Nh from the combination sets on the basis of the average read transfer rate R1ave attached to each of the combinations. In step S131, the selection section 53 obtains the write transfer rate R0 supplied from the transfer rate monitoring section 51 via the determination section 52. Then, the selection section 53 searches for the average read transfer rate R1ave higher than the write transfer rate R0, from the combination sets of the skip interval Ns and the number of consecutive frames Nh, which are read from the combination set storage section 64.

In step S132, the selection section 53 determines whether or not there is a combination corresponding to the average read transfer rate R1ave higher than the write transfer rate R0 in the combination sets of the skip interval Ns and the number of consecutive frames Nh. When it is determined that there is a combination corresponding to the average read transfer rate R1ave higher than the write transfer rate R0 in the combination sets, the process proceeds to step S133, where the combination having the lowest priority value, that is, the combination which is given the highest priority, among the combinations corresponding to the average read transfer rate R1ave higher than the write transfer rate R0, is selected.

In step S134, the selection section 63 supplies the skip interval Ns and the number of consecutive frames Nh of the selected combination to the high-speed playback control section 65, and the processing is then completed.

When it is determined in step S132 that there is no combination corresponding to the average read transfer rate R1ave higher than the write transfer rate R0 in the combination sets, since there is no combination with which the high-speed playback can be maintained, the process proceeds to step S135, where the selection section 63 supplies data indicating no solution to the high-speed playback control section 65, and the processing is then completed.

As described above, the write transfer rate R0 is compared with the average read transfer rate R1ave attached to each of the combinations, and a combination corresponding to the average read transfer rate R1ave higher than the write transfer rate R0 is selected from the combination sets. The average read transfer rate R1ave, as described above, is an average value of the read transfer rates R1 when image data is read from the optical disc 31 in comparison with the standard by using the skip interval Ns and the number of consecutive frames Nh of each combination. Therefore, as a result of performing a high-speed playback by using the skip interval Ns and the number of consecutive frames Nh of the selected combination, the write transfer rate R0 is suppressed to a value lower than the average read transfer rate R1ave. As a result, even if the amount of data of data read from the optical disc 31 per unit time is reduced for the factors such as the surface of the optical disc 31 being damaged or the optical disc 31 being warped, the high-speed playback is maintained.

When the amount of data read from the optical disc 31 per unit time becomes larger, such as when the reading of data from a damaged portion on the surface of the optical disc 31 is terminated and data is begun to be read from a portion, which is not damaged, on the surface of the optical disc 31, the combination of the skip interval Ns and the number of consecutive frames Nh, by which a better quality image can be displayed, is selected. As a result, a better quality image is displayed while the high-speed playback is maintained.

That is, according to the process described with reference to the flowchart of FIG. 18, the average read transfer rate R1ave (I) that is measured beforehand enables the combination of the skip interval Ns and the number of consecutive frames Nh to be dynamically changed in accordance with the write transfer rate R0.

As described above, on the basis of the image data recorded on the data recording medium, a higher quality image can be displayed while the high-speed playback is continued more stably.

Furthermore, the moving image can be played back at a high speed on the basis of the image data provided from the server via a network.

FIG. 19 is a block diagram showing another configuration of an embodiment of a playback apparatus according to the present invention. Components in FIG. 19, which are identical to those shown in FIG. 6, are designated with the same reference numerals, and accordingly, descriptions thereof are omitted. A communication section 101 is formed of a dedicated IC or a NIC (Network Interface Card), and communicates with the server 132 via the network 131. For example, the communication section 101 is connected to the network 131 via a wired connection such as an optical fiber, a twisted-pair cable, or a coaxial cable, or via a wireless connection.

The communication section 101 requests the server 132 to transmit image data via the network 131 and receives image data transmitted from the server 132 via the network 131. The communication section 101 supplies the received image data to the buffer 33. For example, the server 132 transmits image data that is coded by the MPEG-2 system via the network 131.

A control section 102 is formed of a dedicated IC, a general-purpose CPU, or a general-purpose MPU to be embedded, and controls the overall playback apparatus. More specifically, the control section 102 controls the drive 32, the buffer 33, and the decoder 34. That is, the control section 102 controls the obtainment of image data from the server 132 by the communication section 101 via the network 131, controls the temporary storage of image data by the buffer 33, and controls the decoding of image data by the decoder 34.

The control section 102 includes the transfer rate monitoring section 61, the determination section 62, the selection section 63, a combination set storage section 64, a high-speed playback control section 141, and the storage control section 66. The high-speed playback control section 141 may be configured as dedicated hardware or may be realized by the control section 36, which is a computer that executes a program.

On the basis of the data supplied from the selection section 63, the high-speed playback control section 141 controls the communication section 101 and the decoder 34 so that a high-speed playback is performed. That is, on the basis of the skip interval Ns and the number of consecutive frames Nh indicated by the data supplied from the selection section 63, the high-speed playback control section 141 controls the obtainment of the image data from the server 132 and the output of the result of decoding the image data via the network 131.

The high-speed playback control section 141 includes a communication control section 151 and a decoding control section 72. The communication control section 151 controls the communication section 101 on the basis of the data supplied from the selection section 63. More specifically, the communication control section 151 controls the obtainment of the image data from the server 132 via the network 131 of the communication section 101 so that one piece of data of a picture is obtained for each number of GOPs of the skip interval Ns indicated by the data supplied from the selection section 63. For example, the communication control section 151 makes a request so that the communication section 101 causes the server 132 to transmit the first data of an I picture of the GOP at the beginning among the GOPs of the number of skip intervals Ns via the network 131. The communication control section 151 causes the communication section 101 to receive the data of an I picture transmitted from the server 132 via the network 131.

The network 131 is formed of a LAN (Local Area Network), the Internet, or a dedicated network, in which a wireless connection or a wired connection is a transmission medium. The server 132 is formed of a server-dedicated machine or a personal computer, and provides image data recorded on a built-in data recording medium to the playback apparatus via the network 131. The communication section 161 of the server 132 receives the request for the image data, which is transmitted from the playback apparatus, via the network 131, and transmits the requested image data via the network 131.

The process of the high-speed playback by the playback apparatus whose configuration is shown in FIG. 19 is identical to the process described with reference to the flowchart in FIG. 11, and accordingly, descriptions thereof are omitted.

The decoding control process by the playback apparatus whose configuration is shown in FIG. 19 is identical to the process described with reference to the flowchart in FIG. 13, and accordingly, descriptions thereof are omitted.

The process of computing the skip interval and the number of consecutive frames by the playback apparatus whose configuration is shown in FIG. 19 is identical to the process described with reference to the flowcharts in FIGS. 14 to 16 or the flowchart in FIG. 18, and accordingly, descriptions thereof are omitted.

Figure 20:
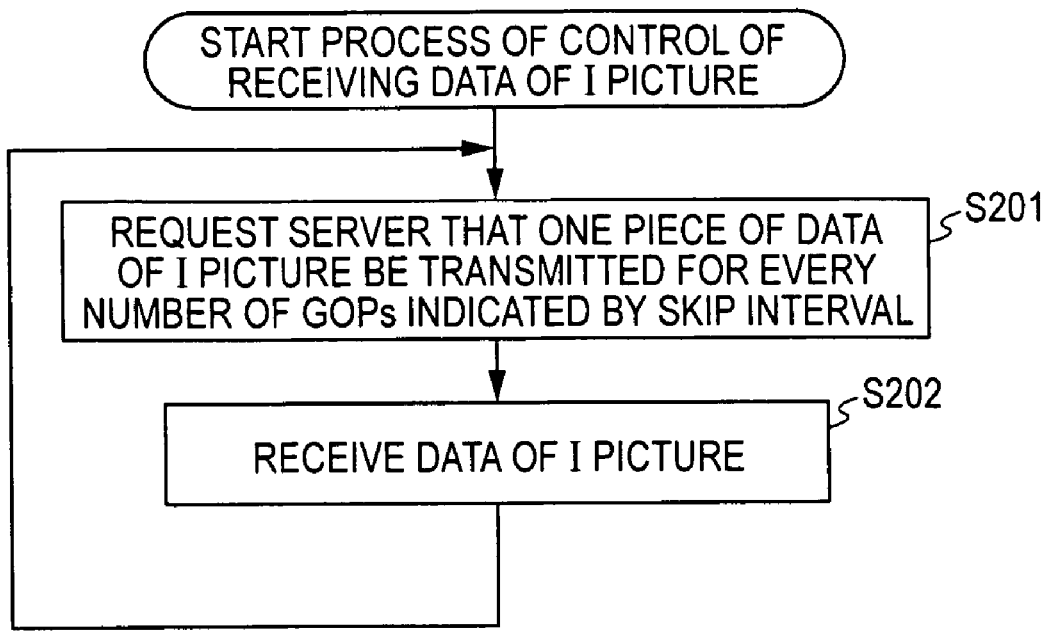
FIG. 20 is a flowchart illustrating a control process of receiving data of an I picture.

FIG. 20 is a flowchart illustrating a process of control of receiving data of an I picture by the communication control section 151 of the high-speed playback control section 141. In step S201, the communication control section 151 requests the server 132 via the network 131 so that the communication section 101 transmits one piece of data of an I picture for each number of GOPs indicated by the skip interval Ns. For example, in step S201, the communication control section 151 causes the communication section 101 to transmit a transmission request containing the skip interval Ns to the server 132 via the network 131.

When the image data is requested from the playback apparatus, the server 132 transmits the image data via the network 131. Therefore, in step S202, the communication control section 151 causes the communication section 101 to receive the data of an I picture, which is transmitted from the server 132. The process then returns to step S201, and the processing is repeated. The communication section 101 supplies the received data of an I picture to the buffer 33.

Figure 21:
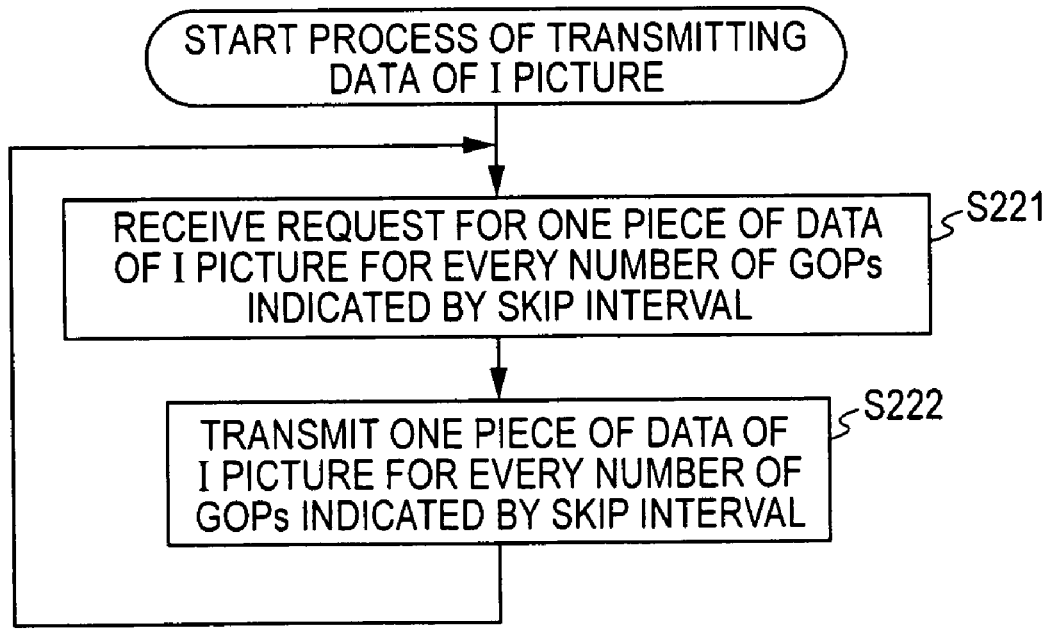
FIG. 21 is a flowchart illustrating a process of transmitting data of an I picture.

FIG. 21 is a flowchart illustrating the process of transmitting data of an I picture by the communication section 161 of the server 132. In step S221, the communication section 161 of the server 132 receives the request of the one piece of the data of an I picture for each number of GOPs indicated by the skip interval Ns, which is transmitted from the playback apparatus via the network 131. For example, the communication section 161 receives the transmission request containing the skip interval Ns, which is transmitted from the playback apparatus via the network 131.

In step S222, the communication section 161 transmits one piece of the data of an I picture for each number of GOPs indicated by the skip interval Ns to the playback apparatus via the network 131. The process then returns to step S222, and the processing is repeated.

The data of an I picture may be transmitted for a plurality of times at one request.

As described above, on the basis of the skip interval Ns and the number of consecutive frames Nh, the image data transmitted from the server 132 via the network 131 can be received, and a moving image can be played back at a high speed.

As has thus been described, even when the amount of the data read from the optical disc 31 is temporarily decreased due to the state defect and vibration (scratches and warps) of the optical disc 31, the high-speed playback can be continued.

Furthermore, even when the amount of the received data, which is data transmitted by the server 132 via the network 131 is temporarily decreased, the high-speed playback can be continued.

Since the skip interval Ns and the number of consecutive frames Nh can be changed, there is no need to determine the skip interval Ns and the number of consecutive frames Nh by considering exceptional factors, and thus, a higher quality image can be displayed in the high-speed playback.

The storage control section 66 may also determine whether or not the write transfer rate R0 is lower than the read transfer rate R1. For example, when the amount of the data stored in the buffer 33 is decreased even though the write transfer rate R0 exceeds 0, the storage control section 66 determines that the write transfer rate R0 is lower than the read transfer rate R1.

The image data read from the optical disc 31 or the image data transmitted from the server 132 via the network 131 has been described as being coded by the MPEG-2 system. In addition, the image data may be coded by a system, such as MPEG-4 or H.264/AVC (Advanced Video Coding). It is sufficient that the image data is image data that is coded by setting a predetermined number of images (for example, frames or fields) as a unit.

It has been described that image data is read from the optical disc 31. In addition to being read from the optical disc 31, image data can be read from a data recording medium, such as the magnetic disk 81, the magneto-optical disc 82, or the semiconductor memory 83. This data recording medium needs only to be accessed in the so-called random manner.

The present invention can be applied to a playback apparatus for playing back a moving image, such as a stationary or portable player, a stationary or portable personal computer, a PDA (Personal Digital Assistant), or a cellular phone. Furthermore, the present invention can be applied to an apparatus having a playback function, such as a stationary or portable recorder.

As described above, when one image among a plurality number of units is decoded and the decoded image is repeatedly displayed on the basis of moving image data for displaying a moving image, the moving image being coded by setting a plurality of number of images as a unit, the moving image can be played back at a speed higher than a normal speed of the moving image. Furthermore, a higher quality image can be displayed while the high-speed playback is continued more stably when the obtained moving image data is temporarily stored; the moving image data read from the storage means is decoded; a first transfer rate that indicates the amount of the moving image data written into the storage means per unit time is detected, and a second transfer rate that indicates the amount of the moving image data read from the storage means per unit time is detected; the storage of combination information that indicates a combination of a number of units such that a number, which is one of the units from which one piece of image data for displaying one image contained in the units is obtained, the image data forming the moving image data, and the number of consecutive units, which are subsequent to the above one unit, from which the image data is not obtained, are added together; and the number of times of repeatedly outputting the result in which the one piece of the obtained image data is decoded, the combination information corresponding to the playback speed of the moving image, is controlled; one of the combinations from among the combinations indicated by the stored combination information is selected in a predetermined procedure when the relationship between the first transfer rate and the second transfer rate reaches a predetermined relationship; the obtainment of the image data is controlled so that one piece of the image data is obtained for each number of the units in the selected combination; and output is controlled so that the result of the decoding of one piece of the obtained image data is repeatedly output for the number of times in the selected combination.

Although the series of the above-described processes can be performed by hardware, it can also be executed by software. When the series of processes is performed by software, a program forming the software is installed from a recording medium into a computer incorporated into dedicated hardware or into a general-purpose computer capable of executing various functions by installing various programs.

This recording medium, as shown in FIG. 6 or FIG. 19, is formed of a packaged medium composed of the magnetic disk 81 (including a flexible disk), the optical disk 31 (including a CD-ROM (Compact Disc-Read Only Memory) or a DVD (Digital Versatile Disc)), the magneto-optical disc 82 (including an MD (Mini-Disc) (trademark)), or the semiconductor memory 83. Alternatively, the recording medium is formed of a ROM (not shown), a hard disk (not shown), in which a program is recorded, etc., which is provided to the user in a state in which the ROM and/or the hard disk are incorporated in advance into a computer.

The program for performing the above-described series of processes may be installed into a computer from a wired or wireless communication medium, such as a local area network, the Internet, or a digital satellite broadcast, via an interface such as a router or a modem as necessary.

In this specification, steps for writing a program recorded on a recording medium may be executed chronologically according to the written orders. However, they do not have to be executed chronologically, and may be executed concurrently or individually.

In this specification, the system designates the overall apparatus formed of a plurality of devices.

It should be understood by those skilled in the art that various modifications, combinations, sub-combinations and alterations may occur depending on design requirements and other factors insofar as they are within the scope of the appended claims or the equivalents thereof.

What is claimed is:

1. A playback apparatus for playing back a moving image at a speed higher than a normal speed of the moving image on the basis of moving image data for displaying the moving image, the moving image data being coded by setting a predetermined number of images as a unit, the playback apparatus comprising:

storage means for temporarily storing the obtained moving image data;

decoding means for decoding the moving image data read from the storage means;

detection means for detecting a first transfer rate that indicates the amount of the moving image data written into the storage means per unit time and for detecting a second transfer rate that indicates the amount of the moving image data read from the storage means per unit time;

storage control means for controlling the storage of combination information that indicates a combination of a number of units such that a number, which is one of the units from which one piece of image data for displaying one image contained in the units is obtained, the image data forming the moving image data, and the number of consecutive units, which are subsequent to the above one unit, from which the image data is not obtained, are added together; and the number of times of repeatedly outputting the result in which the one piece of the obtained image data is decoded, the combination information corresponding to the playback speed of the moving image;

selection means for selecting one of the combinations from among the combinations indicated by the stored combination information in a predetermined procedure when the relationship between the first transfer rate and the second transfer rate reaches a predetermined relationship;

obtainment control means for controlling the obtainment of the image data so that one piece of the image data is obtained for each number of the units in the selected combination; and output control means for controlling output so that the result of the decoding of one piece of the obtained image data is repeatedly output for the number of times in the selected combination.

2. The playback apparatus according to claim 1, wherein the obtainment control means controls the obtainment of the image data by controlling the reading of the image data from a data recording medium on which the moving image data is recorded.

3. The playback apparatus according to claim 1, wherein the obtainment control means controls the obtainment of the image data by controlling the reception of the image data transmitted from an information providing apparatus via a network.

4. The playback apparatus according to claim 1, wherein the selection means selects the combination of a larger number of the units from among the combinations indicated by the stored combination information when the first transfer rate is lower than the second transfer rate.

5. The playback apparatus according to claim 1, wherein the selection means selects the combination of a smaller number of the units from among the combinations indicated by the stored information when the first transfer rate is higher than the second transfer rate.

6. The playback apparatus according to claim 1, wherein the selection means selects the combination in the order of a priority that is attached in advance to each of the combinations.

7. The playback apparatus according to claim 1, wherein the selection means selects one of the combinations on the basis of a reference value of a transfer rate that indicates the amount of the moving image data that is written into the storage means or that is read from the storage means per unit time, the reference value being attached in advance to each of the combinations, and on the basis of the combinations in which the relationship between the first transfer rate and the second transfer satisfies a predetermined relationship.

8. A playback method for use with a playback apparatus for playing back a moving image at a speed higher than a normal speed of the moving image on the basis of moving image data for displaying the moving image, the moving image data being coded by setting a predetermined number of images as a unit, the playback apparatus including storage means for temporarily storing the obtained moving image data; and decoding means for decoding the moving image data read from the storage means, the playback method comprising the steps of:

detecting a first transfer rate that indicates the amount of the moving image data written into the storage means per unit time and a second transfer rate that indicates the amount of the moving image data read from the storage means per unit time;

controlling the storage of combination information that indicates a combination of a number of units such that a number, which is one of the units from which one piece of image data for displaying one image contained in the units is obtained, the image data forming the moving image data, and the number of consecutive units, which are subsequent to the above one unit, from which the image data is not obtained, are added together; and the number of times of repeatedly outputting the result in which the one piece of the obtained image data is decoded, the combination information corresponding to the playback speed of the moving image;

selecting one of the combinations from among the combinations indicated by the stored combination information in a predetermined procedure when the relationship between the first transfer rate and the second transfer rate reaches a predetermined relationship;

controlling the obtainment of the image data so that one piece of the image data is obtained for each number of the units in the selected combination; and controlling output so that the result of the decoding of one piece of the obtained image data is repeatedly output for the number of times in the selected combination.

9. A non-transitory recording medium having recorded thereon a computer-readable program used for a playback process of a playback apparatus for playing back a moving image at a speed higher than a normal speed of the moving image on the basis of moving image data for displaying the moving image, the moving image data being coded by setting a predetermined number of images as a unit, the playback apparatus including storage means for temporarily storing the obtained moving image data; and decoding means for decoding the moving image data read from the storage means, the program comprising the steps of:

detecting a first transfer rate that indicates the amount of the moving image data written into the storage means per unit time and a second transfer rate that indicates the amount of the moving image data read from the storage means per unit time;

controlling the storage of combination information that indicates a combination of a number of units such that a number, which is one of the units from which one piece of image data for displaying one image contained in the units is obtained, the image data forming the moving image data, and the number of consecutive units, which are subsequent to the above one unit, from which the image data is not obtained, are added together; and the number of times of repeatedly outputting the result in which the one piece of the obtained image data is decoded, the combination information corresponding to the playback speed of the moving image;

selecting one of the combinations from among the combinations indicated by the stored combination information in a predetermined procedure when the relationship between the first transfer rate and the second transfer rate reaches a predetermined relationship;

controlling the obtainment of the image data so that one piece of the image data is obtained for each number of the units in the selected combination; and controlling output so that the result of the decoding of one piece of the obtained image data is repeatedly output for the number of times in the selected combination.

10. A playback apparatus for playing back a moving image at a speed higher than a normal speed of the moving image on the basis of moving image data for displaying the moving image, the moving image data being coded by setting a predetermined number of images as a unit, the playback apparatus comprising:

a storage section temporarily storing the obtained moving image data;

a decoding section decoding the moving image data read from the storage section;

a detection section detecting a first transfer rate that indicates the amount of the moving image data written into the storage section per unit time and a second transfer rate that indicates the amount of the moving image data read from the storage section per unit time;

a storage control section controlling the storage of combination information that indicates a combination of a number of units such that a number, which is one of the units from which one piece of image data for displaying one image contained in the units is obtained, the image data forming the moving image data, and the number of consecutive units, which are subsequent to the above one unit, from which the image data is not obtained, are added together; and the number of times of repeatedly outputting the result in which the one piece of the obtained image data is decoded, the combination information corresponding to the playback speed of the moving image;

a selection section selecting one of the combinations from among the combinations indicated by the stored combination information in a predetermined procedure when the relationship between the first transfer rate and the second transfer rate reaches a predetermined relationship;

an obtainment control section controlling the obtainment of the image data so that one piece of the image data is obtained for each number of the units in the selected combination; and an output control section controlling output so that the result of the decoding of one piece of the obtained image data is repeatedly output for the number of times in the selected combination.

11. The playback apparatus according to claim 10, wherein the obtainment control section controls the obtainment of the image data by controlling the reading of the image data from a data recording medium on which the moving image data is recorded.

12. The playback apparatus according to claim 10, wherein the obtainment control section controls the obtainment of the image data by controlling the reception of the image data transmitted from an information providing apparatus via a network.

13. The playback apparatus according to claim 10, wherein the selection section selects the combination of a larger number of the units from among the combinations indicated by the stored combination information when the first transfer rate is lower than the second transfer rate.

14. The playback apparatus according to claim 10, wherein the selection section selects the combination of a smaller number of the units from among the combinations indicated by the stored information when the first transfer rate is higher than the second transfer rate.

15. The playback apparatus according to claim 10, wherein the selection section selects the combination in the order of a priority that is attached in advance to each of the combinations.

16. The playback apparatus according to claim 10, wherein the selection section selects one of the combinations on the basis of a reference value of a transfer rate that indicates the amount of the moving image data that is written into the storage section or that is read from the storage section per unit time, the reference value being attached in advance to each of the combinations, and on the basis of the combinations in which the relationship between the first transfer rate and the second transfer satisfies a predetermined relationship.

* * * * *